(12) United States Patent
Matsubara et al.

(10) Patent No.: US 12,463,472 B2
(45) Date of Patent: Nov. 4, 2025

(54) CHARGING DEVICE AND CHARGING METHOD

(71) Applicant: Panasonic Automotive Systems Co., Ltd., Kanagawa (JP)

(72) Inventors: Akira Matsubara, Osaka Fu (JP); Masahiro Seo, Osaka Fu (JP); Eisuke Kobayashi, Kanagawa Ken (JP); Gentaro Takeda, Osaka Fu (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 0 days.

(21) Appl. No.: 18/815,170

(22) Filed: Aug. 26, 2024

(65) Prior Publication Data

US 2025/0079912 A1   Mar. 6, 2025

(30) Foreign Application Priority Data

Aug. 29, 2023   (JP) .................... 2023-138689
Sep. 19, 2023   (JP) .................... 2023-151428
May 14, 2024   (JP) .................... 2024-078787

(51) Int. Cl.
*H02J 50/90* (2016.01)
*H02J 50/00* (2016.01)
*H02J 50/12* (2016.01)
*H02J 50/80* (2016.01)

(52) U.S. Cl.
CPC ............ *H02J 50/90* (2016.02); *H02J 50/005* (2020.01); *H02J 50/12* (2016.02); *H02J 50/80* (2016.02)

(58) Field of Classification Search
CPC .. H02J 50/90; H02J 50/80; H02J 50/12; H02J 50/005
USPC ........................................................ 307/104
See application file for complete search history.

(56) References Cited

U.S. PATENT DOCUMENTS

| | | | |
|---|---|---|---|
| 9,630,516 B2* | 4/2017 | Enomoto | B60L 53/305 |
| 9,744,870 B2* | 8/2017 | Cronie | H02J 50/90 |
| 10,011,181 B2* | 7/2018 | Dudar | H04B 5/79 |
| 10,199,856 B2* | 2/2019 | Ashinghurst | H02J 50/12 |
| 2011/0204845 A1* | 8/2011 | Paparo | H02J 7/0044 320/108 |
| 2016/0129793 A1* | 5/2016 | Cronie | H02J 50/90 320/109 |
| 2016/0264007 A1* | 9/2016 | Haase | B60L 53/126 |

(Continued)

FOREIGN PATENT DOCUMENTS

JP   2010-288429   12/2010

*Primary Examiner* — Alfonso Perez Borroto
(74) *Attorney, Agent, or Firm* — GREENBLUM & BERNSTEIN, P.L.C.

(57) ABSTRACT

A charging device is disclosed. A housing of the charging device has a placement surface on which an object to be charged is allowed to be placed. The object to be charged includes a first coil. The charging device includes a second coil and a controller. The second coil is housed in the housing at a position corresponding to the first coil. The controller acquires a parameter indicating a distance between the first coil and the second coil. The controller generates inductive coupling between the first coil and the second coil when the distance indicated by the parameter is less than a distance threshold. The controller generates resonant coupling between the first coil and the second coil when the distance indicated by the parameter exceeds the distance threshold.

18 Claims, 18 Drawing Sheets

(56) References Cited

U.S. PATENT DOCUMENTS

2020/0247264 A1\* 8/2020 Woodruff, III ....... H04W 76/20
2021/0170889 A1\* 6/2021 Kanagaraj ............ G06Q 20/322

\* cited by examiner

CHARGING DEVICE AND CHARGING METHOD

CROSS-REFERENCE TO RELATED APPLICATIONS

This application is based upon and claims the benefit of priority from Japanese Patent Application No. 2023-138689, filed on Aug. 29, 2023, Japanese Patent Application No. 2023-151428, filed on Sep. 19, 2023, and Japanese Patent Application No. 2024-078787, filed on May 14, 2024, the entire contents of which are incorporated herein by reference.

FIELD

The present disclosure relates generally to a charging device and a charging method.

BACKGROUND

A charging device capable of performing wireless charging has been known. When an object to be charged is placed on a placement surface of a housing of the charging device, the charging device transmits electric power from a coil in the housing to a coil in the object to be charged in a form of electromagnetic energy (for example, a patent literature JP 2010-288429 A).

By the transmission of electric power described above, the charging device can perform wireless charging on the object to be charged.

In such a charging device, depending on a distance between the coil in the housing and the coil in the object to be charged, electric power transmitted to the coil in the object to be charged is sometimes weaker than allowable electric power.

This may make it difficult for the charging device to appropriately perform the wireless charging on the object to be charged.

SUMMARY

A charging device according to one aspect of the present disclosure includes a housing, a second coil, and a hardware processor connected to memories. The housing includes a placement surface on which an object to be charged including a first coil is allowed to be placed. The second coil is housed in the housing at a position corresponding to the first coil. The hardware processor is configured to acquire a parameter indicating a distance between the first coil and the second coil. The hardware processor is configured to generate inductive coupling between the first coil and the second coil when the distance indicated by the parameter is less than a distance threshold. The hardware processor is configured to generate resonant coupling between the first coil and the second coil when the distance indicated by the parameter exceeds the distance threshold.

DETAILED DESCRIPTION

An embodiment of a charging device according to the present disclosure will be described with reference to the drawings.

Embodiment

A charging device according to an embodiment can perform wireless charging. When an object to be charged is placed on a placement surface of a housing of the charging device, the charging device transmits electric power from a coil in the housing to a coil in the object to be charged in a form of electromagnetic energy or the like. According to the embodiment, the charging device is devised to appropriately perform wireless charging.

Figure 1:
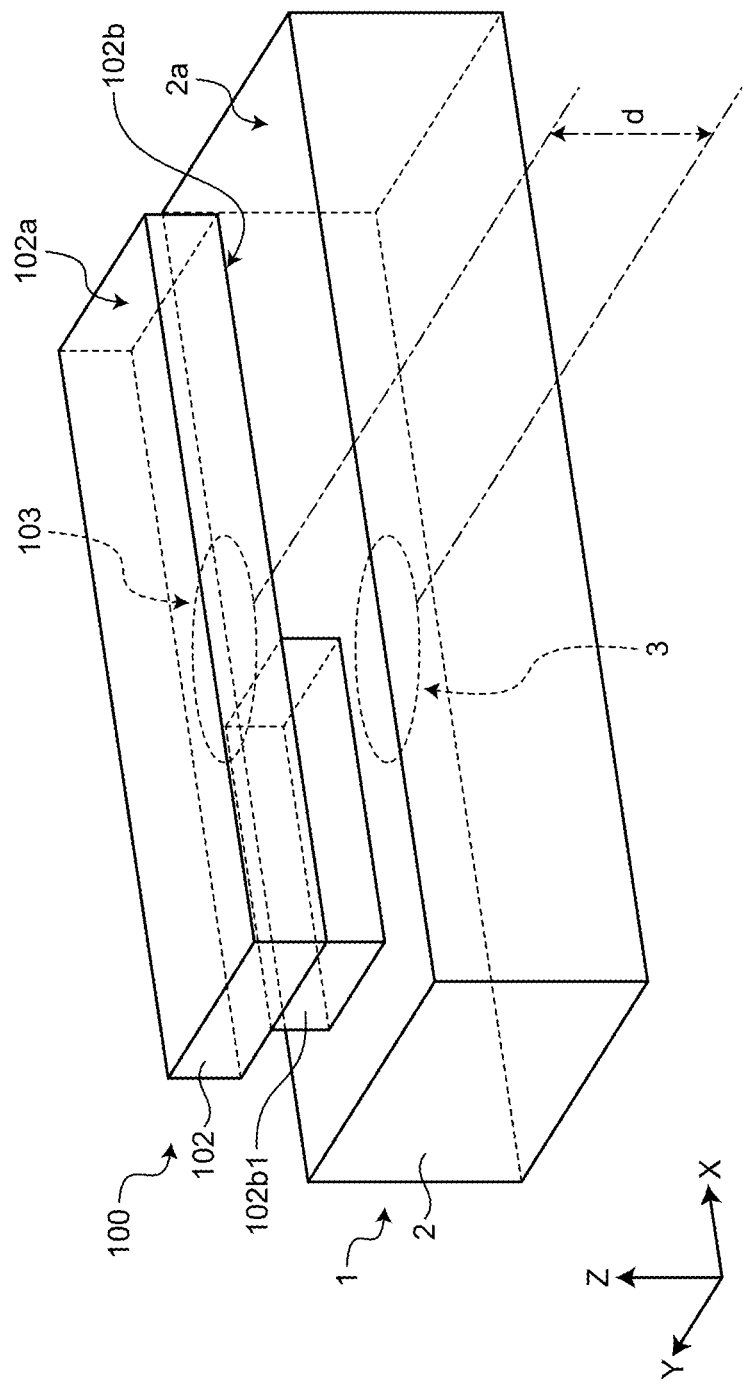
FIG. 1 is a diagram illustrating an example of an exterior configuration of a charging device according to an embodiment.
Figure 2:
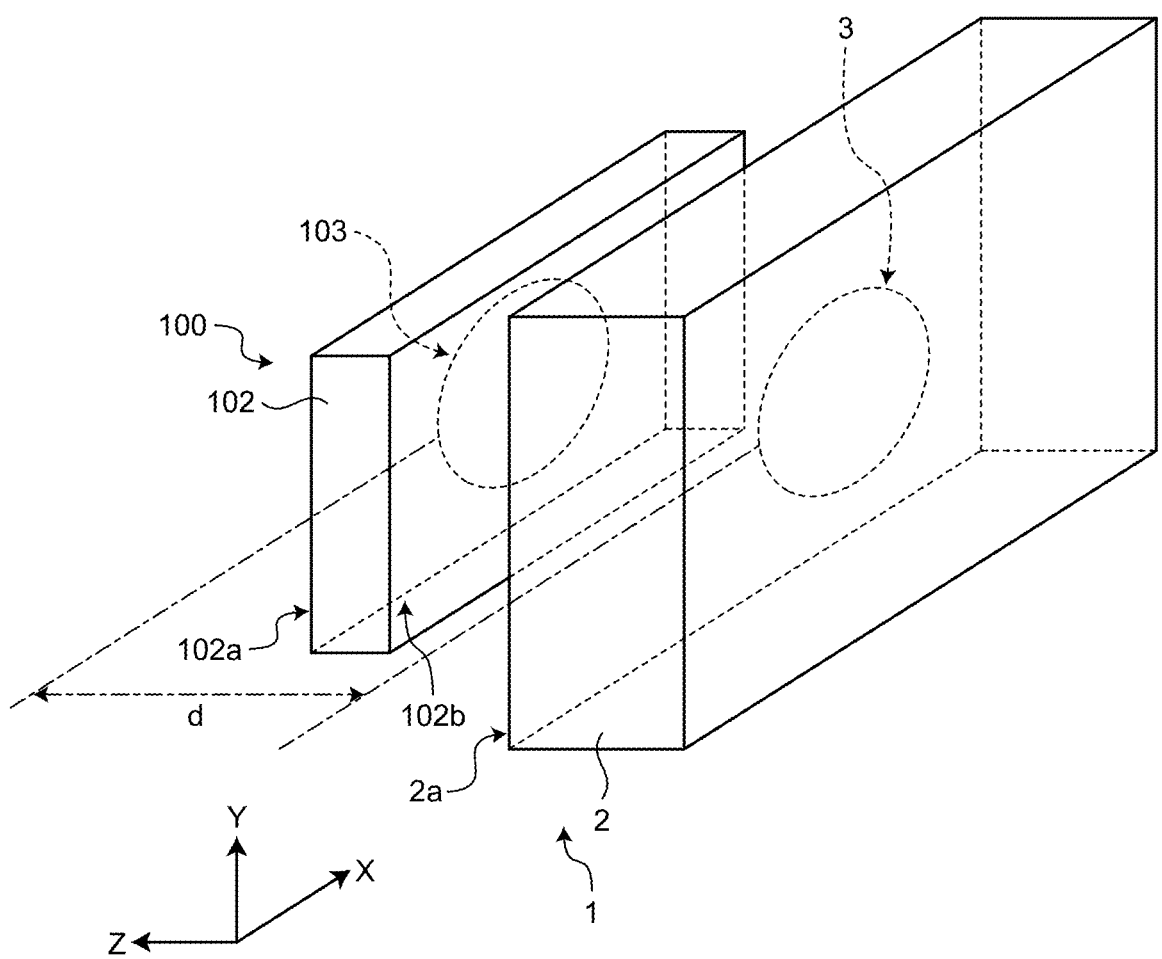
FIG. 2 is a diagram illustrating another example of the exterior configuration of the charging device according to the embodiment.

A charging device 1 can be configured as illustrated in FIG. 1 or FIG. 2. FIG. 1 is a diagram illustrating an example of an exterior configuration of the charging device 1 and illustrates an exterior configuration in the case where the charging device 1 is a horizontal type. FIG. 2 is a diagram illustrating another example of the exterior configuration of the charging device 1 and illustrates an exterior configuration in the case where the charging device 1 is a vertical type.

An object 100 to be charged may be electronic equipment including a display such as a smartphone terminal, a tablet terminal, or a smart watch or may be electronic equipment not including a display such as a wireless earphone, a wireless speaker, or a wireless mouse. The object 100 to be charged may have a flat box shape. In accordance with the shape of the object 100 to be charged, the charging device 1 may have a box shape.

The charging device 1 has a wireless charging function. The object 100 to be charged that is compliant with the wireless charging function can be placed on a placement surface 2a of the charging device 1. FIGS. 1 and 2 exemplify a state where the object 100 to be charged is placed on the placement surface 2a. The charging device 1 includes a housing 2 and a power transmission coil 3 (an example of the second coil). In the charging device 1, the power transmission coil 3 is placed in the vicinity of the placement surface 2a in the housing 2. In the following description, a longitudinal direction of the housing 2 is defined as an X direction, a lateral direction of the housing 2 is defined as a Y direction, and a direction perpendicular to the X direction and the Y direction is defined as a Z direction.

In the present specification, a positive direction of a Z axis is sometimes expressed as "upward", "upper side", or "upper surface side". Similarly, a negative direction of the Z axis is sometimes expressed to as "downward", "lower side", or "lower surface side". A plane stretched by an X axis and a Y axis and a direction in the plane are respectively sometimes expressed as "horizontal plane" and "horizontal direction".

In the present specification, "parallel", "horizontal", "vertical", and "orthogonal" include not only complete parallel, horizontal, vertical, and orthogonal but also deviations from parallel, horizontal, vertical, and orthogonal within a margin of error. In addition, "substantially" means the same in an approximate range.

The object 100 to be charged includes a housing 102 and a power reception coil 103 (an example of the first coil). The housing 102 includes a front surface 102a and a rear surface 102b. The object 100 to be charged has a display structure (not illustrated) in the vicinity of a front surface 100a. The power reception coil 103 is placed in the vicinity of the rear surface 102b in the housing 102. The charging device 1 may have a wireless charging function of a moving scheme. The power transmission coil 3 may be configured to be movable in an XY directions in the housing 2. As illustrated in FIGS. 1 and 2, is it also conceivable that the charging device 1 is capable of efficiently performing wireless charging by moving the power transmission coil 3 in the XY direction such that an XY position of the power transmission coil 3 matches an XY position of the power reception coil 103.

It is conceivable that wireless charging of electromagnetic induction scheme is used as the wireless charging of the charging device 1. In the electromagnetic induction wireless charging, inductive coupling is generated between the power transmission coil 3 and the power reception coil 103, and electric power is transmitted from the power transmission coil 3 to the power reception coil 103 in a form of electromagnetic energy or the like.

In the charging device 1, a Z-direction distance d between the power transmission coil 3 and the power reception coil 103 is sometimes long.

In a case where the charging device 1 is the horizontal type, the gravity acts in the –Z direction to make it easy to press the object 100 to be charged against the placement surface 2a. As illustrated in FIG. 1, the object 100 to be charged sometimes has a convex structure 102b1 such as a camera lens on the rear surface 102b. In this case, in a state where the object 100 to be charged is placed on the placement surface 2a, the Z-direction distance d between the power transmission coil 3 and the power reception coil 103 increases by the Z thickness of the convex structure 102b1 more than a planned distance.

In a case where the charging device 1 is the vertical type, the gravity acts in a-Y direction, so that it is difficult to press the object 100 to be charged against the placement surface 2a. As illustrated in FIG. 2, the object 100 to be charged can be placed such that the housing 102 is spaced away from the housing 2 of the charging device 1 in the Z direction. In this case, in the state where object 100 to be charged is placed on the placement surface 2a, the Z direction distance d between the power transmission coil 3 and the power reception coil 103 increases by a clearance between housings 2 and 102 more than the planned distance.

In a case of the wireless charging of the electromagnetic induction scheme, when the Z-direction distance d between the power transmission coil 3 and the power reception coil 103 increases, electric power transmitted from the power transmission coil 3 to the power reception coil 103 becomes weaker than allowable electric power, a charging time increases, or automatic charging is not started, in some case. This makes it difficult for the charging device 1 to appropriately perform the wireless charging on the object 100 to be charged.

In contrast, there is a magnetic field resonance scheme in which resonant coupling is generated between a pair of coils and electric power is transmitted from one coil to the other coil in a form of electromagnetic energy or the like. The magnetic field resonance scheme is also called magnetic field sympathizing scheme. If the magnetic field resonance scheme is applied to the wireless charging of the charging device 1, it is expected that appropriate charging can be performed even if the Z-direction distance d between the power transmission coil 3 and the power reception coil 103 is long.

Therefore, the charging device 1 acquires a parameter indicating the Z-direction distance d between the power transmission coil 3 and the power reception coil 103 and switches a wireless charging scheme between the electromagnetic induction scheme and the magnetic field resonance scheme in accordance with the Z-direction distance d indicated by the parameter to thereby achieve appropriate wireless charging in a wide distance range.

Figure 3:
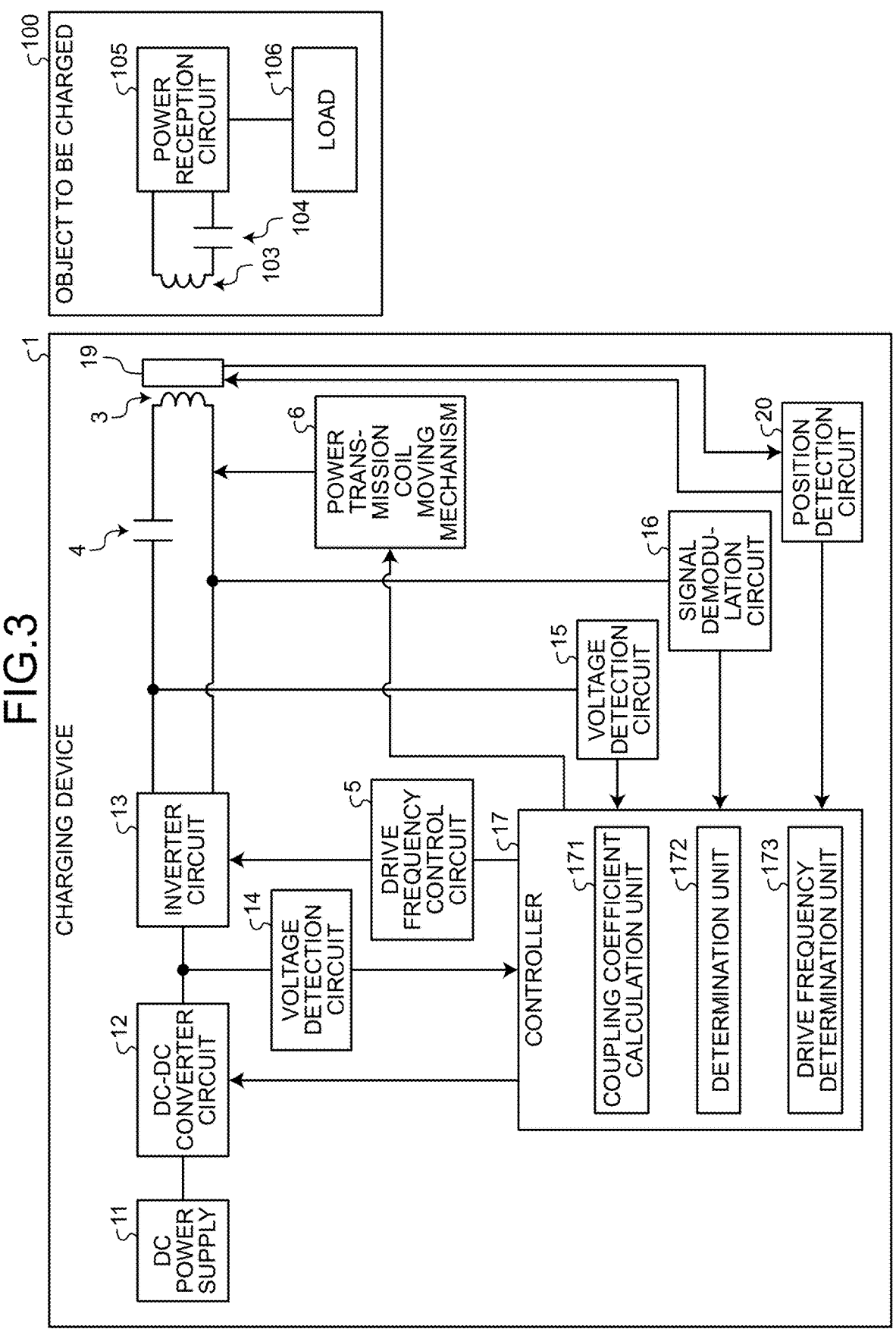
FIG. 3 is a diagram illustrating a configuration of the charging device according to the embodiment.

In addition to the housing 2 and the power transmission coil 3, the charging device 1 includes, as illustrated in FIG. 3, a DC power supply 11, a DC-DC converter circuit 12, an inverter circuit 13, a voltage detection circuit 14, a voltage detection circuit 15, a drive frequency control circuit 5, a capacitor 4, a signal demodulation circuit 16, a position detection pattern coil 19, a position detection circuit 20, a power transmission coil moving mechanism 6, and a controller 17. The object 100 to be charged includes a capacitor 104, a power reception circuit 105, and a load 106 in addition to the housing 102 and the power reception coil 103. FIG. 3 is a diagram illustrating a configuration of the charging device 1.

In the charging device 1, the controller 17 comprehensively controls the units of the charging device 1.

The controller 17 acquires a parameter Pd indicating the Z-direction distance d between the power transmission coil 3 and the power reception coil 103. When the Z-direction distance d indicated by the parameter Pd is less than a distance threshold THpd, the controller 17 generates inductive coupling between the power transmission coil 3 and the power reception coil 103 such that the wireless charging is performed in the electromagnetic induction scheme. When the Z-direction distance d indicated by the parameter Pd exceeds the distance threshold THpd, the controller 17 generates resonant coupling between the power transmission coil 3 and the power reception coil 103 such that the wireless charging is performed in the magnetic field resonance scheme.

A coupling coefficient k between the power transmission coil 3 and the power reception coil 103 may be used as the parameter Pd indicating the Z-direction distance d between the power transmission coil 3 and the power reception coil 103. The coupling coefficient k indicates a degree of inductive coupling between the power transmission coil 3 and the power reception coil 103 and takes a value of 0 or more and 1 or less.

The coupling coefficient k can be defined by the following Formula 1.

$$k = \frac{M_{3\_103}}{\sqrt{L_3 L_{103}}}$$ Mathematical Formula 1

In Formula 1, $L_3$ indicates the self-inductance of the power transmission coil 3. $L_{103}$ indicates the self-inductance of the power reception coil 103. $M_{3\_103}$ indicates the mutual inductance of the power transmission coil 3 and the power reception coil 103. The coupling coefficient k is correlated with the Z-direction distance d between the power transmission coil 3 and the power reception coil 103. A value of the coupling coefficient k tends to be smaller as the Z-direction distance d between the power transmission coil 3 and the power reception coil 103 is longer.

The controller 17 may obtain the coupling coefficient k by calculating the coupling coefficient k with calculation described later. When the coupling coefficient k exceeds a coefficient threshold THk, the controller 17 may generate inductive coupling between the power transmission coil 3 and the power reception coil 103 such that the wireless charging is performed in the electromagnetic induction scheme. The coefficient threshold THk corresponds to the distance threshold THpd. When the coupling coefficient k is less than the coefficient threshold THk, the controller 17 may generate resonant coupling between the power transmission coil 3 and the power reception coil 103 such that the wireless charging is performed in the magnetic field resonance scheme.

The DC power supply 11 generates a DC power supply voltage Vdc1. The DC power supply 11 may be a battery, may be a power supply circuit that receives a DC power supply voltage from the outside, or may be a power supply circuit that receives an AC power supply voltage from the outside and converts the AC power supply voltage into a DC power supply voltage. The DC power supply 11 supplies the DC power supply voltage Vdc1 to the DC-DC converter circuit 12.

The DC-DC converter circuit 12 converts the DC power supply voltage Vdc1 into a DC voltage Vdc2 under the control of the controller 17. The DC-DC converter circuit 12 may step up the DC power supply voltage Vdc1 and convert the DC power supply voltage Vdc1 into the DC voltage Vdc2, may step down the DC power supply voltage Vdc1 and convert the DC power supply voltage Vdc1 into the DC voltage Vdc2, or may convert the DC power supply voltage Vdc1 into the DC voltage Vdc2 while adjusting a waveform thereof while keeping the DC power supply voltage Vdc1 at an equal voltage. The DC-DC converter circuit 12 supplies the DC voltage Vdc2 to the inverter circuit 13.

The drive frequency control circuit 5 generates a control signal for controlling a drive frequency of the inverter circuit 13 under the control of the controller 17. When the inverter circuit 13 includes a switching element, the control signal may be a switching control signal for turning on and off the switching element at a cycle based on the drive frequency. The drive frequency control circuit 5 supplies the control signal to the inverter circuit 13.

When, for example, the Z-direction distance d indicated by the parameter Pd is less than the distance threshold THpd, the controller 17 controls the drive frequency of the inverter circuit 13 to be a predetermined frequency fc. The predetermined frequency fc can be experimentally determined in advance as a frequency suitable for the electromagnetic induction scheme and fixedly set in the controller 17. When the coupling coefficient k exceeds the coefficient threshold THk, the controller 17 may control the drive frequency of the inverter circuit 13 to be the predetermined frequency fc. In accordance with the control of the controller 17, the drive frequency control circuit 5 generates a control signal for controlling the drive frequency to be the predetermined frequency fc and supplies the control signal to the inverter circuit 13. The controller 17 can allow the wireless charging to be performed in the electromagnetic induction scheme.

When the Z-direction distance d indicated by the parameter Pd exceeds the distance threshold THpd, the controller 17 controls the drive frequency of the inverter circuit 13 to be the resonance frequency fr. When the coupling coefficient k is less than the coefficient threshold THk, the controller 17 may control the drive frequency of the inverter circuit 13 to be the resonance frequency fr. The resonance frequency fr is a resonance frequency of a resonance circuit formed by the power reception coil 103 and the capacitor 104 in the object 100 to be charged. The controller 17 may calculate the resonance frequency fr by using an inductance design value of the power reception coil 103 and a capacitance design value of the capacitor 104. The drive frequency control circuit 5 generates, in accordance with the control of the controller 17, a control signal for controlling the drive frequency to be the resonance frequency fr and supplies the control signal to the inverter circuit 13. The controller 17 can allow the wireless charging to be performed in the magnetic field resonance scheme.

The inverter circuit 13 operates at the drive frequency indicated by the control signal and converts the DC voltage Vdc2 into a single-phase AC voltage Vac1. The inverter circuit 13 may include a switching element and may convert the DC voltage Vdc2 into the single-phase AC voltage Vac1 by turning on and off the switching element at a cycle corresponding to the drive frequency. The inverter circuit 13 can supply the single-phase AC voltage Vac1 to the power transmission coil 3 through the capacitor 4. Thus, the inverter circuit 13 is capable of driving the power transmission coil 3 through the capacitor 4.

The capacitor 4 is connected between the inverter circuit 13 and the power transmission coil 3. The capacitor 4 has one end connected to a P-side output node of the inverter circuit 13 and the other end connected to the power transmission coil 3. The capacitor 4 receives the single-phase AC voltage Vac1 from the inverter circuit 13 and transmits the single-phase AC voltage Vac1 to the power transmission coil 3. Since the capacitor 4 is provided between the inverter circuit 13 and the power transmission coil 3, the AC voltage Vac1 can be smoothed and the efficiency and the stability of the wireless charging can be improved.

The power transmission coil 3 is connected between the capacitor 4 and the inverter circuit 13. One end of the power transmission coil 3 is connected to the capacitor 4 and the other end is connected to an N-side output node of the inverter circuit 13.

The voltage detection circuit 14 detects a voltage Vin on an input side of the inverter circuit 13. The voltage detection circuit 14 has a detection node connected to a line that connects the DC-DC converter circuit 12 and the inverter circuit 13. The voltage detection circuit 14 may detect the voltage Vin on the input side of the inverter circuit 13 via the detection node. The voltage detection circuit 14 supplies the detected voltage Vin to the controller 17. Thus, the controller 17 can calculate the coupling coefficient k by using the voltage Vin.

The voltage detection circuit 15 detects a voltage $V_{CTX\_PP}$ on an output side of the inverter circuit 13. The voltage detection circuit 15 has a detection node connected to a line that connects the inverter circuit 13 and the capacitor 4. The voltage detection circuit 15 may detect a maximum amplitude voltage of an AC voltage Vac on the output side of the inverter circuit 13 as the voltage $V_{CTX\_PP}$ via the detection node. The voltage detection circuit 15 supplies the detected voltage $V_{CTX\_PP}$ to the controller 17. Thus, the controller 17 can calculate the coupling coefficient k by using the voltage $V_{CTX\_PP}$.

The controller 17 can perform communication with the object 100 to be charged.

The controller 17 may transmit information to the object 100 to be charged through the drive frequency control circuit 5, the inverter circuit 13, and the power transmission coil 3. The controller 17 frequency-modulates the drive frequency in accordance with the information and transmits an AC signal including a modulation component to the object 100 to be charged. Upon receiving the AC signal with the power reception coil 103, the object 100 to be charged extracts the modulation component from the AC signal and restores the information with the power reception circuit 105. The object 100 to be charged may perform an operation corresponding to the restored information.

The controller 17 may transmit the information to the object 100 to be charged through the DC-DC converter circuit 12, the inverter circuit 13, and the power transmission coil 3. The controller 17 performs amplitude-modulation on the amplitude of the DC voltage Vdc2 in accordance with the information and transmits an AC signal including a modulation component to the object 100 to be charged. Upon receiving the AC signal with the power reception coil 103, the object 100 to be charged extracts the modulation component from the AC signal and restores the information with the power reception circuit 105. The object 100 to be charged may perform an operation corresponding to the restored information.

The controller 17 may transmit the information with a modulation scheme other than the frequency modulation and the amplitude modulation.

The controller 17 may receive the information from the object 100 to be charged through the power transmission coil 3 and the signal demodulation circuit 16. When the AC signal is received from the object 100 to be charged, the signal demodulation circuit 16 extracts the modulation component from the AC signal and restores the information. The signal demodulation circuit 16 may restore the information in the frequency modulation scheme, may restore the information in the amplitude modulation scheme, or may restore the information in another modulation scheme. The signal demodulation circuit 16 supplies the restored information to the controller 17.

The position detection pattern coil 19 is placed between the power transmission coil 3 and the placement surface 2*a* (see FIG. 1 and FIG. 2). The position detection pattern coil 19 includes a plurality of coils distributed in the XY direction.

The position detection circuit 20 is connected between the position detection pattern coil 19 and the controller 17. The position detection circuit 20 is connected to each of the coils of the position detection pattern coil 19. The position detection circuit 20 is capable of detecting an XY position of the power reception coil 103 under the control by the controller 17.

The controller 17 may detect the XY position of the power reception coil 103 in the object 100 to be charged by using the position detection circuit 20 and the position detection pattern coil 19. The position detection circuit 20 supplies a pulse to each of the coils of the position detection pattern coil 19 in accordance with the control of the controller 17. The coils respectively generate magnetic fluxes corresponding to pulses. Upon receiving a magnetic flux serving as echo from the power reception coil 103, the coils generate induced current corresponding the magnetic flux and return the induced current to the position detection circuit 20. The position detection circuit 20 determines the XY position of the power reception coil 103 on the basis of the induced current of each of the coils. The position detection circuit 20 supplies the determined XY position to the controller 17.

The power transmission coil moving mechanism 6 is capable of moving the power transmission coil 3 in the XY direction under the control by the controller 17.

The controller 17 may move the power transmission coil 3 in the XY direction by using the power transmission coil moving mechanism 6 in accordance with the XY position of the power reception coil 103 detected by the position detection circuit 20. The power transmission coil moving mechanism 6 moves the power transmission coil 3 in the XY direction to approach the XY position of the power reception coil 103 in accordance with the control of the controller 17. Thus, the XY position of the power transmission coil 3 can be aligned so as to match with the XY position of the power reception coil 103.

In the object 100 to be charged, the power reception coil 103 is connected between the capacitor 104 and the power reception circuit 105. The power transmission coil 3 has one end connected to the capacitor 104 and the other end connected to an input node of the power reception circuit 105.

The capacitor 104 is connected between the power reception coil 103 and the power reception circuit 105. The capacitor 104 has one end connected to the power reception coil 103 and the other end connected to an N-side input node of the power reception circuit 105. The capacitor 104 receives the power supply voltage Vac2 from the power reception coil 103 and transmits the power supply voltage Vac2 to the power reception circuit 105.

The power reception circuit 105 generates a charging current corresponding to an induced electromotive force generated in the power reception coil 103.

The load 106 is, for example, a battery and is charged by an output current of the power reception circuit 105.

In the charging device 1, the controller 17 includes, as functional elements, a coupling coefficient calculation unit 171, a determination unit 172, and a drive frequency determination unit 173. The units in the controller 17 may be implemented in a software manner as a module configured in the controller 17 by execution of software. The controller 17 may be a system including, for example, a processor, a non-volatile memory, and a volatile memory. The non-volatile memory stores a computer program. The processor may read the program from the nonvolatile memory and start it while being triggered by power activation or the like of the charging device 1. The processor then collectively loads, on the volatile memory, modules included in the program equivalent to the units at a time of compiling or sequentially according to progress of processing. The processor may operate in accordance with those modules of the program. Alternatively, the units in the controller 17 may be implemented in a hardware manner as circuits provided in the controller 17. Alternatively, part of the units in the controller 17 may be implemented in a software manner and the rest of the units may be implemented in a hardware manner.

The coupling coefficient calculation unit 171 receives the voltage Vin from the voltage detection circuit 14 and receives the voltage $V_{CTX\_PP}$ from the voltage detection circuit 15. The coupling coefficient calculation unit 171 calculates the coupling coefficient k by using the voltage $V_{in}$ and the voltage $V_{CTX\_PP}$. The coupling coefficient calculation unit 171 may perform approximate calculation of a value of the coupling coefficient by the following Formulas 2 and 3.

$$k = E_0 \cdot p + E_1 \quad \text{Mathematical Formula 2}$$

$$p = \frac{V_{rect}}{V_{CTX\_PP} + V_{in}} \quad \text{Mathematical Formula 3}$$

In Formula 2, $E_0$ is a parameter equivalent to an output voltage of the charging device 1 and specific to circuit characteristics of the charging device 1 and the object 100 to be charged. $E_1$ is a parameter that is equivalent to an input voltage of the charging device 1 and is specific to the circuit characteristics of the charging device 1 and the object 100 to be charged. $E_0$ and $E_1$ can be respectively calculated in advance by calibration or the like and set in the controller 17. p is calculated by Formula 3.

In Formula 3, $V_{rect}$ is a voltage reported from the object 100 to be charged by communication. $V_{in}$ is a voltage detected by the voltage detection circuit 14. $V_{CTX\_PP}$ is a voltage detected by the voltage detection circuit 15.

The coupling coefficient calculation unit 171 supplies the calculated coupling coefficient k to the determination unit 172.

The determination unit 172 may determine, from the value of the coupling coefficient k by using the coefficient threshold THk, whether the object 100 to be charged is present in a place separated more than the distance threshold THpd. The coefficient threshold THk can be experimentally determined in advance as a Z-direction distance at which electric power allowed by the electromagnetic induction scheme can be transmitted. The coefficient threshold THk may be, for example, a value within 0.2 to 0.7.

The determination unit 172 compares the coupling coefficient k with the coefficient threshold THk and, if the coupling coefficient k exceeds the coefficient threshold THk, determines that the object 100 to be charged is not separated more than the distance threshold THpd. If the coupling coefficient k is less than coefficient threshold THk, the determination unit 172 determines that the object 100 to be charged is separated more than the distance threshold THpd. The determination unit 172 supplies a determination result to the drive frequency determination unit 173.

The drive frequency determination unit 173 determines a drive frequency of the inverter circuit 13 on the basis of the determination result of the determination unit 172. When the object 100 to be charged is not separated more than the distance threshold THpd, the drive frequency determination unit 173 determines the drive frequency of the inverter circuit 13 to be the predetermined frequency fc. When the object 100 to be charged is separated more than the distance threshold THpd, the drive frequency determination unit 173 determines the drive frequency of the inverter circuit 13 as the resonance frequency fr by the power reception coil 103 and the capacitor 104. The drive frequency determination unit 173 may determine the frequency fr by the following Formula 4.

$$fr = \frac{1}{2\pi\sqrt{(1-k^2)L_{103}C_{104}}} \quad \text{Mathematical Formula 4}$$

In Formula 4, k is a coupling coefficient. $L_{103}$ is a design value of the self-inductance of the power reception coil 103 and can be set in the controller 17 in advance. $C_{104}$ is a design value of the capacitance of the capacitor 104 and can be set in the controller 17 in advance.

The controller 17 controls the drive frequency of the inverter circuit 13 to be the determined frequency via the drive frequency control circuit 5.

Figure 4:
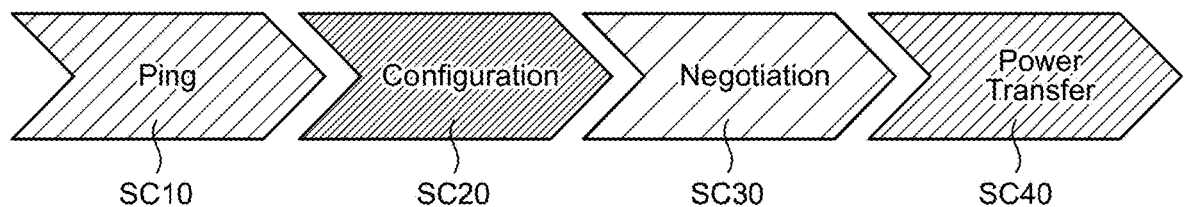
FIG. 4 is a sequence chart illustrating a communication procedure of the charging device according to the embodiment.

Next, a communication procedure of the charging device 1 will be described with reference to FIG. 4. FIG. 4 is a sequence chart illustrating the communication procedure of the charging device.

When the object 100 to be charged is placed on the placement surface 2a, the charging device 1 executes processing of a ping phase (SC10).

Figure 5:
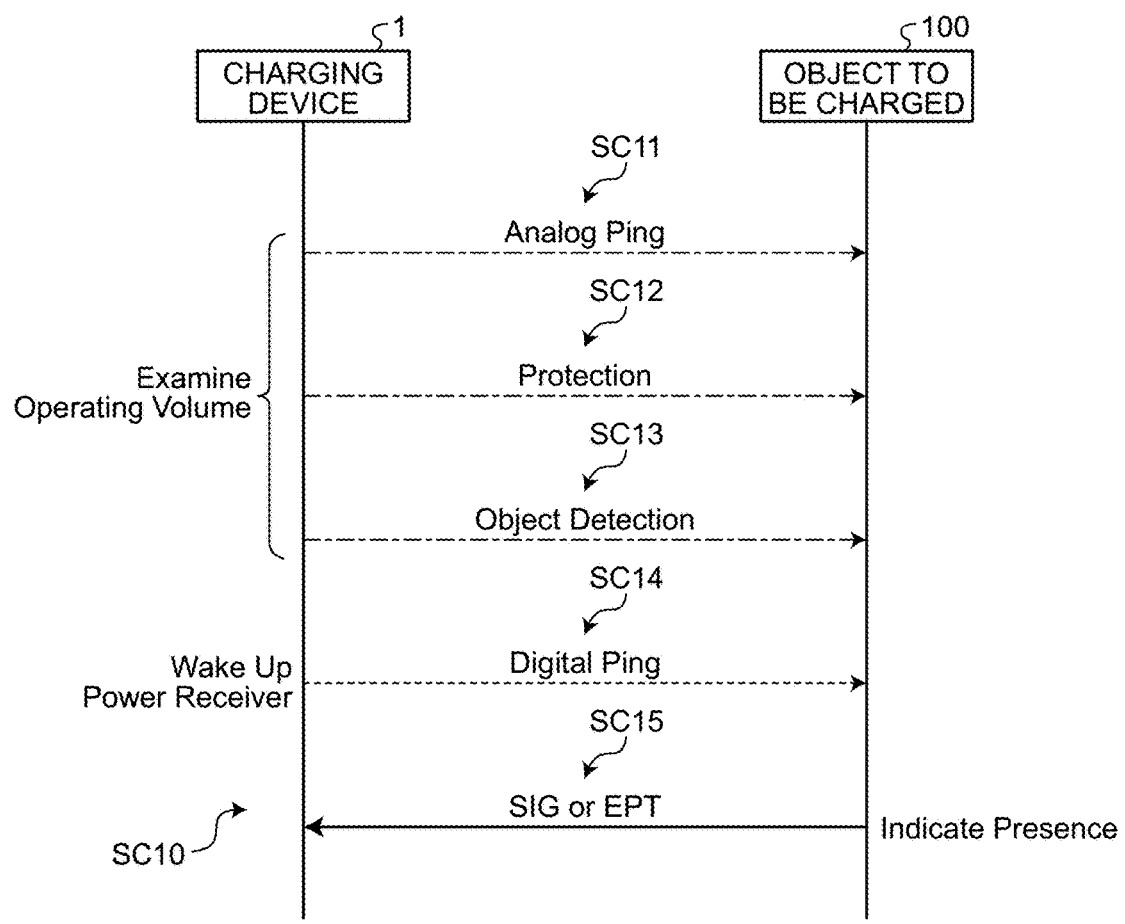
FIG. 5 is a sequence chart illustrating a communication procedure of a ping phase in the embodiment.

In the ping phase (SC10), SC11 to SC15 illustrated in FIG. 5 are performed. FIG. 5 is a sequence chart illustrating a communication procedure of the ping phase (SC10).

In the charging device 1, the controller 17 transmits analog ping (SC11) and transmits a predetermined protection request (Protection) (SC12). After that, the controller 17 transmits an object detection request (Object Detection) (SC13). The controller 17 may perform the processing of the SCs 11 to 13 by using the position detection circuit 20 and the position detection pattern coil 19. In order to detect whether an object is present within a communicable range ("Examine Operating Volume"), the controller 17 stays on standby until a response to the SCs 11 to 13 is received.

Upon receiving a response to the SC11 to SC13, the controller 17 determines that the presence of the object 100 to be charged is detected and transmits digital ping including a wake-up request ("Wake Up Power Receiver") to the object 100 to be charged (SC14).

In response to the above, in order to indicate the presence of the object 100 to be charged ("Indicate Presence"), the object 100 to be charged transmits signal strength data SIG or end power data EPT to the charging device 1 in response to SC14 (SC15).

In the charging device 1, upon receiving the signal strength data SIG or the end power data EPT, the controller 17 determines that the ping phase (SC10) has been completed and executes processing of a configuration phase (SC20).

In the configuration phase (SC20), the controller 17 transmits a configuration information request to the object 100 to be charged and receives configuration information from the object 100 to be charged in response to the configuration information request.

At this time, the controller 17 may calculate the coupling coefficient k in accordance with Formula 3 by using the voltage $V_{rect}$ included in the configuration information.

When the configuration information is received, the controller 17 determines that the configuration phase (SC20) has been completed and executes processing of a negotiation phase (SC30).

In the negotiation phase (SC30), the controller 17 transmits power contract information including a transmittable power level to the object 100 to be charged and thereafter receives, from the object 100 to be charged, a power contract request including a power level calculated taking into account the transmittable power level and a receivable power level. The controller 17 thereby negotiates a power contract.

When the power contract request is received, the controller 17 determines that the negotiation phase (SC30) has been completed and executes processing of a power transfer phase (SC40).

In the power transfer phase (SC40), the controller 17 performs power transmission to the object 100 to be charged in accordance with the power contract.

At this time, when the coupling coefficient k exceeds the coefficient threshold THk, the controller 17 generates inductive coupling between the power transmission coil 3 and the power reception coil 103 such that the wireless charging is performed in the electromagnetic induction scheme. When the coupling coefficient k is less than the coefficient threshold THk, the controller 17 generates resonant coupling between the power transmission coil 3 and the power reception coil 103 so as to perform the wireless charging in the magnetic field resonance scheme.

Figure 6:
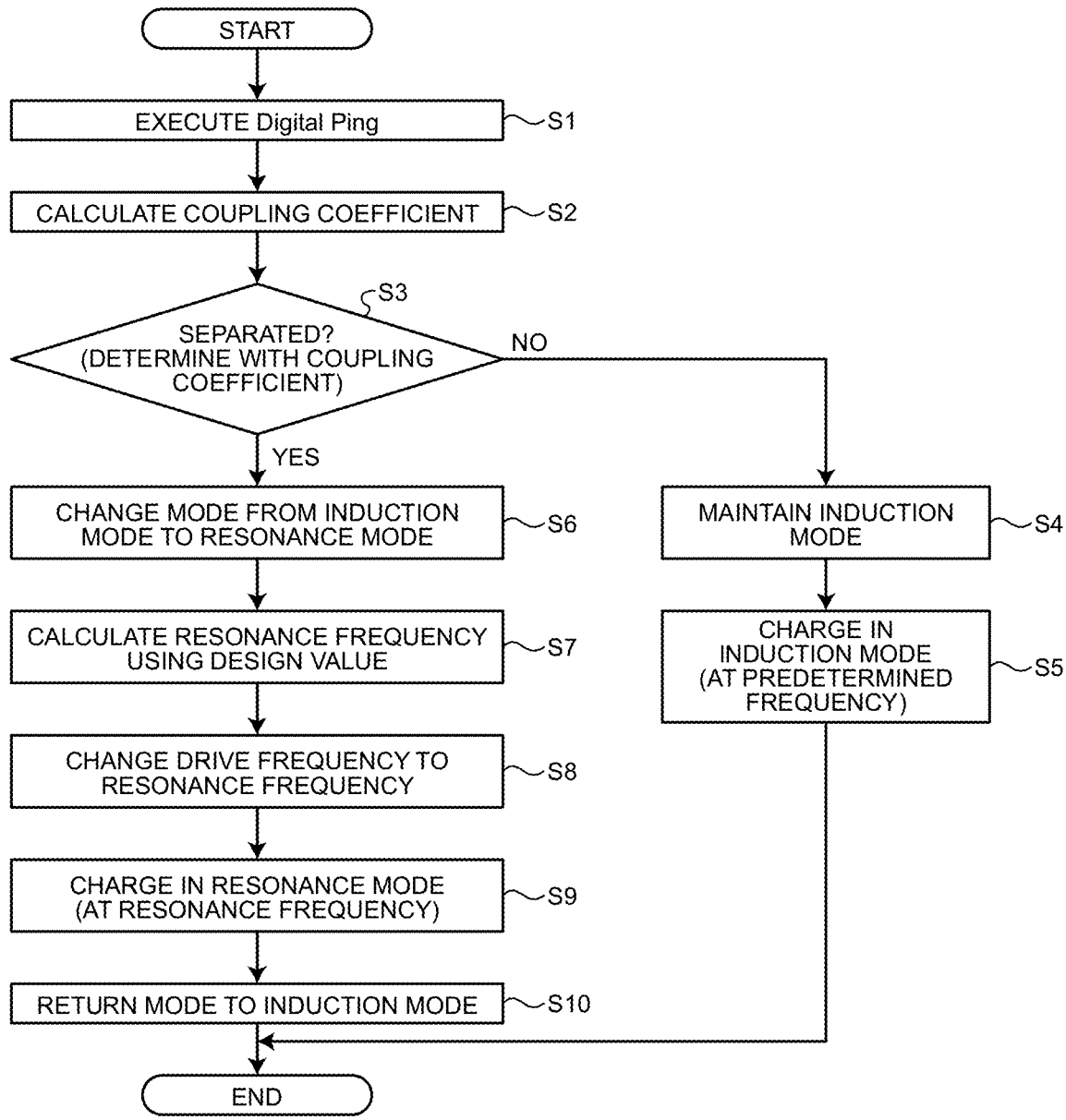
FIG. 6 is a flowchart illustrating an operation of the charging device according to the embodiment.

Next, an operation of the charging device 1 will be described with reference to FIG. 6. FIG. 6 is a flowchart illustrating the operation of the charging device 1. FIG. 6 exemplifies an operation in the case where the charging device 1 has an induction mode corresponding to the electromagnetic induction scheme and a resonance mode corresponding to the magnetic field resonance scheme as operation modes.

It is assumed that, in a default state, the operation mode of the charging device 1 is the induction mode. When the object 100 to be charged is placed on the placement surface 2a and the presence of the object 100 to be charged is detected, the controller 17 executes digital ping (S1). The controller 17 transmits the digital ping to the object 100 to be charged. Upon receiving the signal strength data SIG or the end power data EPT from the object 100 to be charged in response to the digital ping, the controller 17 transmits a configuration information request to the object 100 to be charged.

Upon receiving the configuration information from the object 100 to be charged in response to the configuration information request, the controller 17 calculates the coupling coefficient k in accordance with Formula 3 by using the voltage $V_{rect}$ included in the configuration information (S2).

On the basis of the coupling coefficient k calculated in S2, the controller 17 determines whether the object 100 to be charged is separated more than the distance threshold THpd (S3).

When the coupling coefficient k exceeds the coefficient threshold THk, the controller 17 determines that the object 100 to be charged is not separated more than the distance threshold THpd (No in S3) and maintains the induction mode (S4). The controller 17 performs the wireless charging in the induction mode (S5). The controller 17 controls an operation frequency of the inverter circuit 13 to be the predetermined frequency fc and drives the power transmission coil 3 at the predetermined frequency fc. The controller 17 thereby generates inductive coupling between the power transmission coil 3 and the power reception coil 103 and transmits electric power from the power transmission coil 3 to the power reception coil 103 in the electromagnetic induction scheme.

When the coupling coefficient k is less than the coefficient threshold THk, the controller 17 determines that the object 100 to be charged is separated more than the distance threshold THpd (Yes in S3) and changes the operation mode from the induction mode to the resonance mode (S6). The controller 17 calculates the resonance frequency fr in accordance with Formula 4 by using the inductance design value $L_{103}$ of the power reception coil 103 and the capacitance design value $C_{104}$ of the capacitor 104 (S7).

The controller 17 changes the operation frequency of the inverter circuit 13 from the predetermined frequency fc to the resonance frequency fr (S8) and performs the wireless charging in the resonance mode (S9). The controller 17 controls the operation frequency of the inverter circuit 13 to be the resonance frequency fr and drives the power transmission coil 3 at the resonance frequency fr. The controller 17 thereby generates resonant coupling between the power transmission coil 3 and the power reception coil 103, and transmits electric power from the power transmission coil 3 to the power reception coil 103 in the electric field resonance scheme.

When the wireless charging in the resonance mode (S9) has been completed, the controller 17 returns the operation mode from the resonance mode to the induction mode (S10).

As described above, in the charging device 1 of the embodiment, the controller 17 acquires the parameter Pd indicating the Z-direction distance d between the power transmission coil 3 and the power reception coil 103. The controller 17 then switches the wireless charging scheme between the electromagnetic induction scheme and the magnetic field resonance scheme in accordance with the Z-direction distance d indicated by the parameter Pd. Therefore, the charging device 1 can optimize the wireless charging in a wide distance range.

Note that the idea of the present embodiment may be applied to the charging device 1 having a wireless charging function other than the moving scheme.

For example, a charging device having a wireless charging function of a multi-coil scheme includes multiple power transmission coils distributed in a XY direction and fixed to one another. The charging device changes a power transmission coil to be energized out of the multiple power transmission coils depending on XY positions of power reception coils in an object to be charged. In this charging device as well, the controller acquires the parameter Pd indicating the Z-direction distance d between the power transmission coil 3 and the power reception coil 103 and switches the wireless charging scheme between the electromagnetic induction scheme and the magnetic field resonance scheme in accordance with the Z-direction distance d indicated by parameter Pd. Therefore, it is possible to optimize the wireless charging in a wide distance range.

First Modification

As a first modification of the embodiment, the controller 17 may calculate the resonance frequency fr by using an inductance measurement value of the power reception coil 103 and a capacitance measurement value of the capacitor 104, in place of the inductance design value of the power reception coil 103 and the capacitance design value of the capacitor 104.

The inductance of the power reception coil 103 and the capacitance of the capacitor 104 may be respectively measured at the time of manufacturing the object 100 to be charged and may be included in the configuration information and may be stored respectively as the inductance measurement value of the power reception coil 103 and the capacitance measurement value of the capacitor 104.

In the above case, in the configuration phase (SC20) illustrated in FIG. 4, upon receiving the configuration information from the object 100 to be charged, the controller 17 may calculate the resonance frequency fr in accordance with the following Formula 5 by using an inductance measurement value $L_{103}'$ of the power reception coil 103 and a capacitance measurement value $C_{104}'$ of the capacitor 104 included in the configuration information.

$$fr = \frac{1}{2\pi\sqrt{(1-k^2)L_{103}'C_{103}'}} \quad \text{Mathematical Formula 5}$$

In Formula 5, $L_{103}$ and $C_{104}$ in Formula 4 are respectively replaced with $L_{103}'$ and $C_{104}'$.

Figure 7:
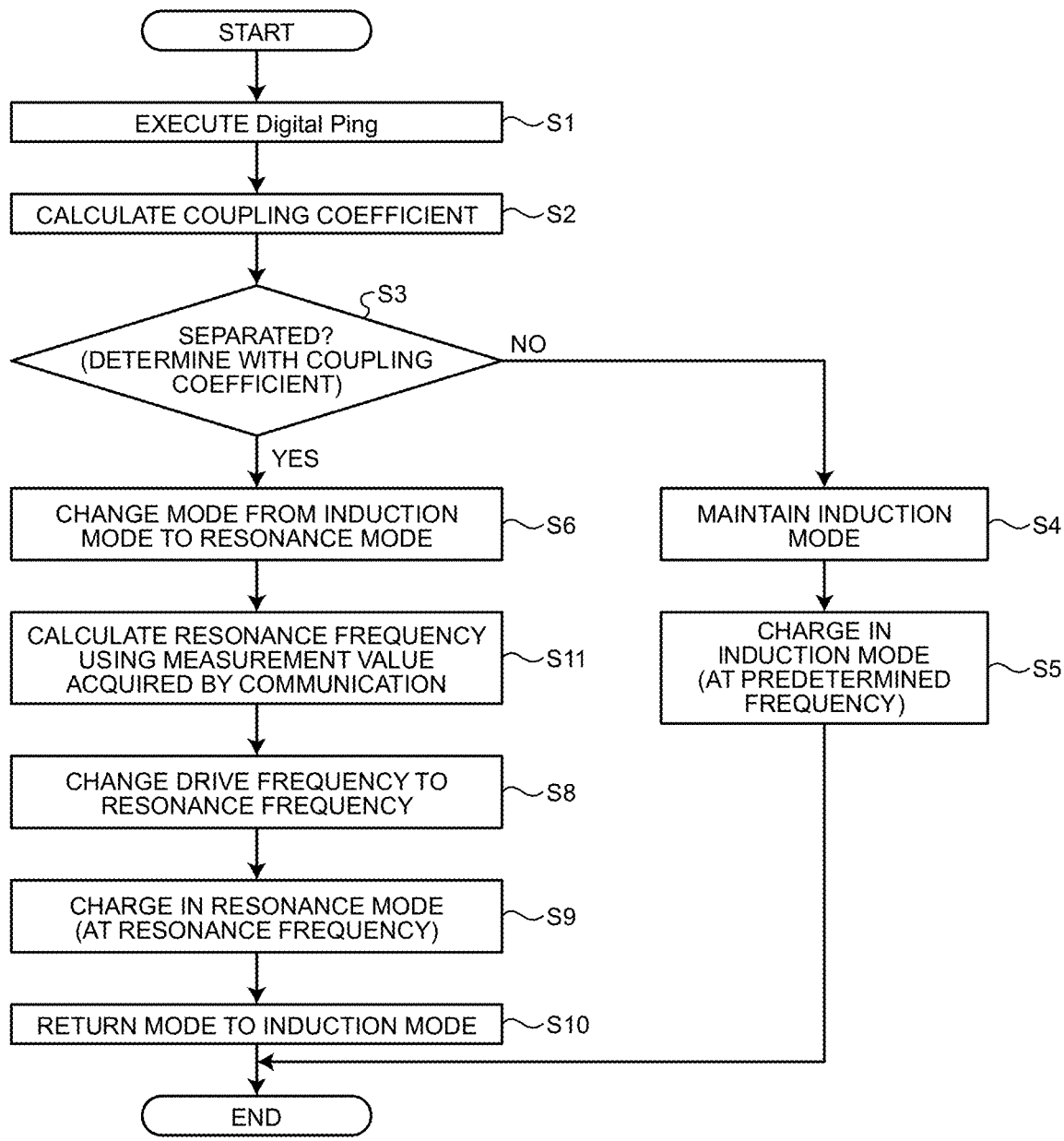
FIG. 7 is a flowchart illustrating an operation of the charging device according to a first modification of the embodiment.

The charging device 1 may perform an operation illustrated in FIG. 7 in place of that in FIG. 6. FIG. 7 is a flowchart illustrating an operation of the charging device 1 according to the first modification of the embodiment.

After S1 to S6 are performed in the same manner as in the embodiment, the controller 17 calculates the resonance frequency fr in accordance with Formula 5 by using the inductance measurement value $L_{103}'$ of the power reception coil 103 and the capacitance measurement value $C_{104}'$ of the capacitor 104 included in the configuration information received in S2 (S11). Thereafter, S8 to S10 are performed in the same manner as in the embodiment.

Therefore, the resonance frequency fr can be more accurately calculated. The wireless charging in the case of switching to the magnetic field resonance scheme can be performed with higher efficiency.

As a second modification of the embodiment, the charging device 1 may perform an operation considering a standard.

In a Qi2 standard formulated by the WPC (Wireless Power Consortium), an MPP (Magnetic Power Profile) is prescribed as a wireless charging function in addition to a BPP (Baseline Power Profile) and an EPP (Extended Power Profile).

The BPP corresponds to a low-speed wireless charging function. Power transmission is performed at low speed with relatively low power. The EPP corresponds to a high-speed wireless charging function. Power transmission is performed at high speed with relatively high power. The MPP corresponds to a higher speed wireless charging function. A magnet is used for aligning a power transmission coil and a power reception coil. Power transmission is performed at high speed with relatively high power in a state where the power transmission coil and the power reception coil are aligned with high precision.

Second Modification

Figure 8:
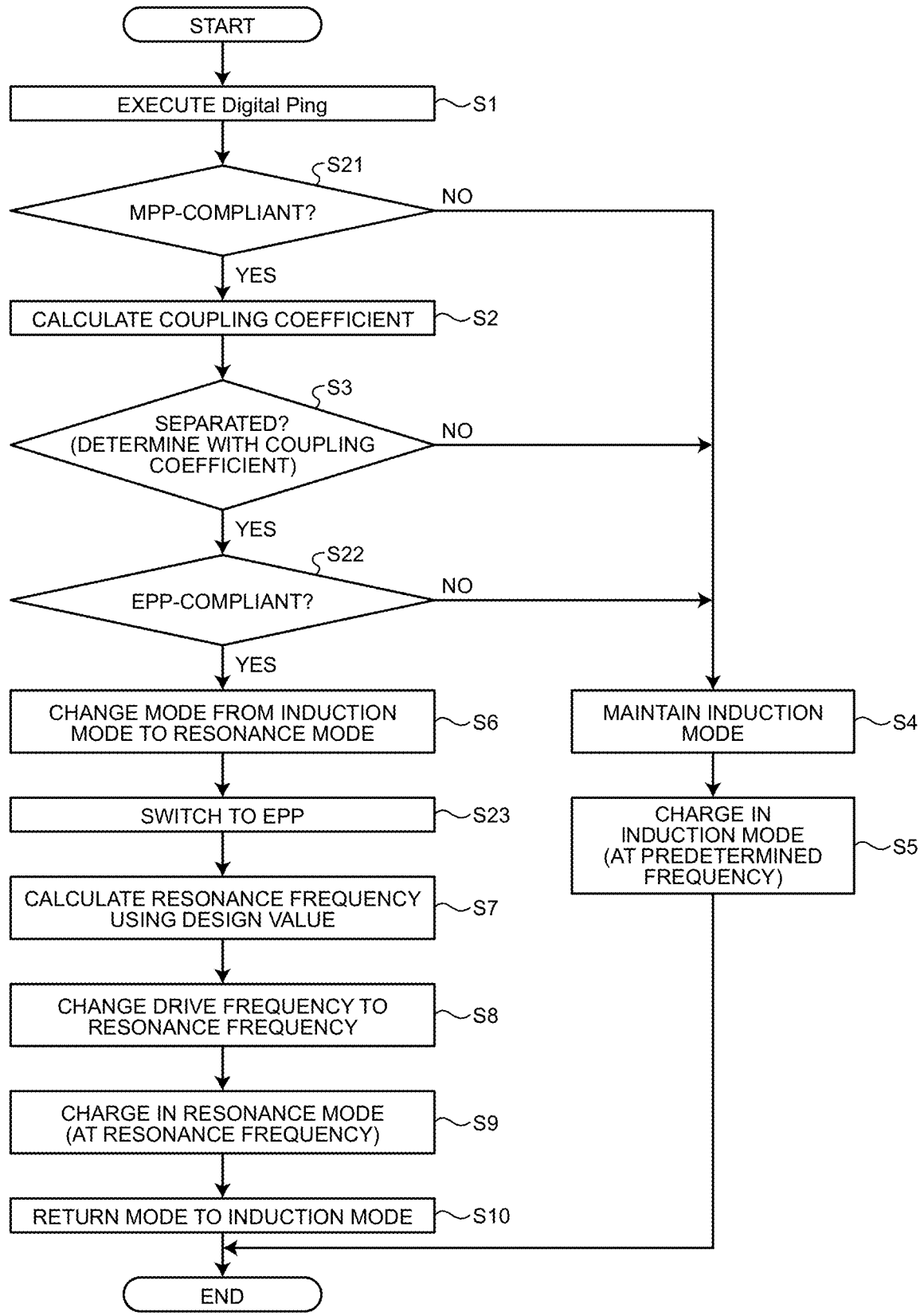
FIG. 8 is a flowchart illustrating an operation of the charging device according to a second modification of the embodiment.

The charging device 1 may perform an operation illustrated in FIG. 8 in place of that in FIG. 6. FIG. 8 is a flowchart illustrating an operation of the charging device 1 according to a second modification of the embodiment.

In the object 100 to be charged that is compliant with the EPP, configuration information including information indicating that this object 100 is compliant with the EPP can be stored in advance in the object 100 at the time of manufacturing the object 100. If the object 100 to be charged is provided with a magnet 107 (not illustrated) whose XY position relative to the power reception coil 103 is fixed, this object 100 is compliant with the MPP. Configuration information further including information indicating that this object 100 is compliant with the MPP can be stored in advance at the time of manufacturing the object 100. If the object 100 to be charged is not provided with the magnet 107, this object 100 is not compliant with the MPP and configuration information not including information indicating that the object 100 is compliant with the MPP can be stored in advance at the time of manufacturing the object 100.

When the charging device 1 is provided with a magnet 7 (not illustrated) whose XY position relative to the power transmission coil 3 is fixed, the charging device 1 is compliant with the MPP. In this case, the charging device 1 sets the charging mode indicating the wireless charging function to the MPP.

After S1 is performed in the same manner as in the embodiment, upon receiving the configuration information from the object 100 to be charged in response to the digital ping, the controller 17 determines, by using the information about the wireless charging function included in the configuration information, whether the object 100 to be charged is compliant with the MPP (S21).

If the object 100 to be charged is not compliant with the MPP (No in S21), the controller 17 maintains the induction mode (S4) and performs the wireless charging in the induction mode (S5).

If the object 100 to be charged is compliant with the MPP (Yes in S21), the controller 17 calculates the coupling coefficient k in accordance with Formula 3 by using the voltage $V_{rect}$ included in the configuration information (S2).

In the Qi2 standard, if the wireless charging function is the MPP, calculation of the coupling coefficient k is prescribed. The controller 17 calculates the coupling coefficient k while observing the Qi2 standard.

On the basis of the coupling coefficient k calculated in S2, the controller 17 determines whether the object 100 to be charged is separated more than the distance threshold THpd (S3).

If the coupling coefficient k exceeds the coefficient threshold THk, the controller 17 determines that the object 100 to be charged is not separated more than the distance threshold THpd (No in S3). The controller 17 then maintains the induction mode (S4) and performs the wireless charging in the induction mode (S5).

If the coupling coefficient k is less than the coefficient threshold THk, the controller 17 determines that the object 100 to be charged is separated more than the distance threshold THpd (Yes in S3) and determines, by using the information about the wireless charging function included in the configuration information, whether the object 100 to be charged is compliant with the EPP (S22).

If the object 100 to be charged is not compliant with the EPP (No in S22), the controller 17 maintains the induction mode (S4) and performs the wireless charging in the induction mode (S5).

If the object 100 to be charged is compliant with o the EPP (Yes in S22), the controller 17 changes the operation mode from the induction mode to the resonance mode (S6) and switches the charging mode from the MPP to the EPP (S23).

According to the Qi2 standard, when the charging device 1 and the object 100 to be charged are both compliant with the MPP, it is not allowed to select the EPP or to switch the MPP to the EPP halfway. If the Qi2 standard is revised such that, when both of the charging device 1 and the object 100 to be charged are compliant with the MPP, it is allowed to select the EPP or switch the MPP to the EPP halfway, it is possible to implement S23 while observing the Qi2 standard.

Thereafter, S7 to S10 are performed in the same manner as in the above-described embodiment.

As described above, in the second modification of the embodiment, the charging device 1 starts with the MPP as the wireless charging function and switches to the EPP in accordance with the Z-direction distance d with respect to the object 100 to be charged. Therefore, the charging device 1 can perform an operation in consideration of the standard.

Third Modification

As a third modification of the embodiment, when performing an operation in which the standard is considered within a possible range, the controller 17 may calculate the resonance frequency fr by using the inductance measurement value of the power reception coil 103 and the capacitance measurement value of the capacitor 104, in place of the inductance design value of the power reception coil 103 and the capacitance design value of the capacitor 104.

The inductance of the power reception coil 103 and the capacitance of the capacitor 104 may be respectively measured at the time of manufacturing the object 100 to be charged and may be included in the configuration information and stored respectively as the inductance measurement value of the power reception coil 103 and the capacitance measurement value of the capacitor 104.

In this case, in the configuration phase (SC20) illustrated in FIG. 4, upon receiving the configuration information from the object 100 to be charged, the controller 17 may calculate the resonance frequency fr in accordance with Formula 5 by using the inductance measurement value $L_{103}'$ of the power reception coil 103 and the capacitance measurement value $C_{104}'$ of the capacitor 104 included in the configuration information.

Figure 9:
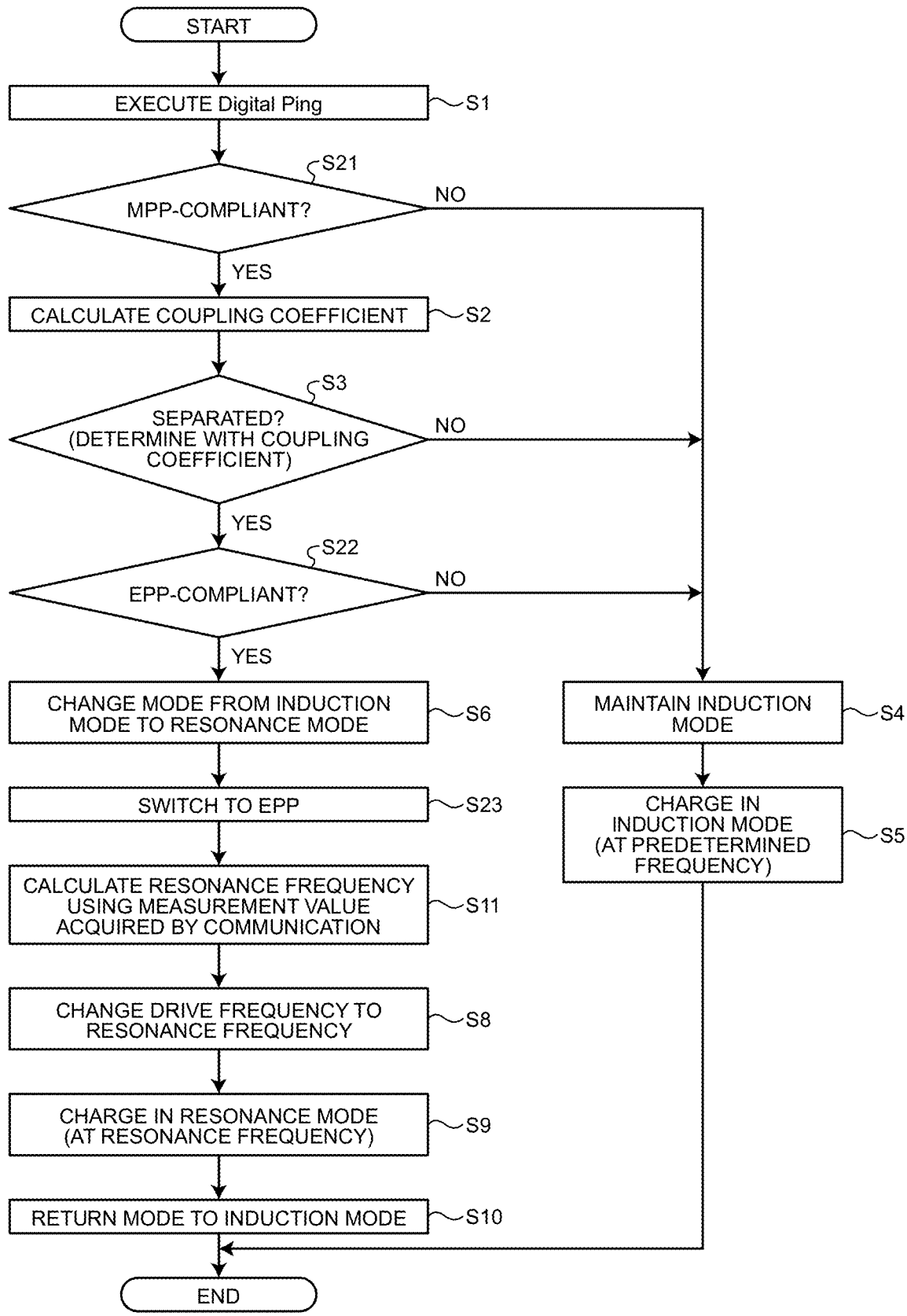
FIG. 9 is a flowchart illustrating an operation of the charging device according to a third modification of the embodiment.

The charging device 1 may perform an operation illustrated in FIG. 9 in place of that in FIG. 8. FIG. 9 is a flowchart illustrating an operation of the charging device 1 according to the third modification of the embodiment.

After the processing S1 to S23 are performed in the same manner as in the second modification of the embodiment, the controller 17 calculates the resonance frequency fr in accordance with Formula 5 by using the inductance measurement value $L_{103}'$ of the power reception coil 103 and the capacitance measurement value $C_{104}'$ of the capacitor 104 included in the configuration information received in S21 (S11). Thereafter, the processing S8 to S10 are performed in the same manner as in the second modification of the embodiment. Therefore, the resonance frequency fr can be more accurately calculated. The wireless charging in the case of switching to the magnetic field resonance scheme can be performed with higher efficiency.

Fourth Modification

Figure 10:
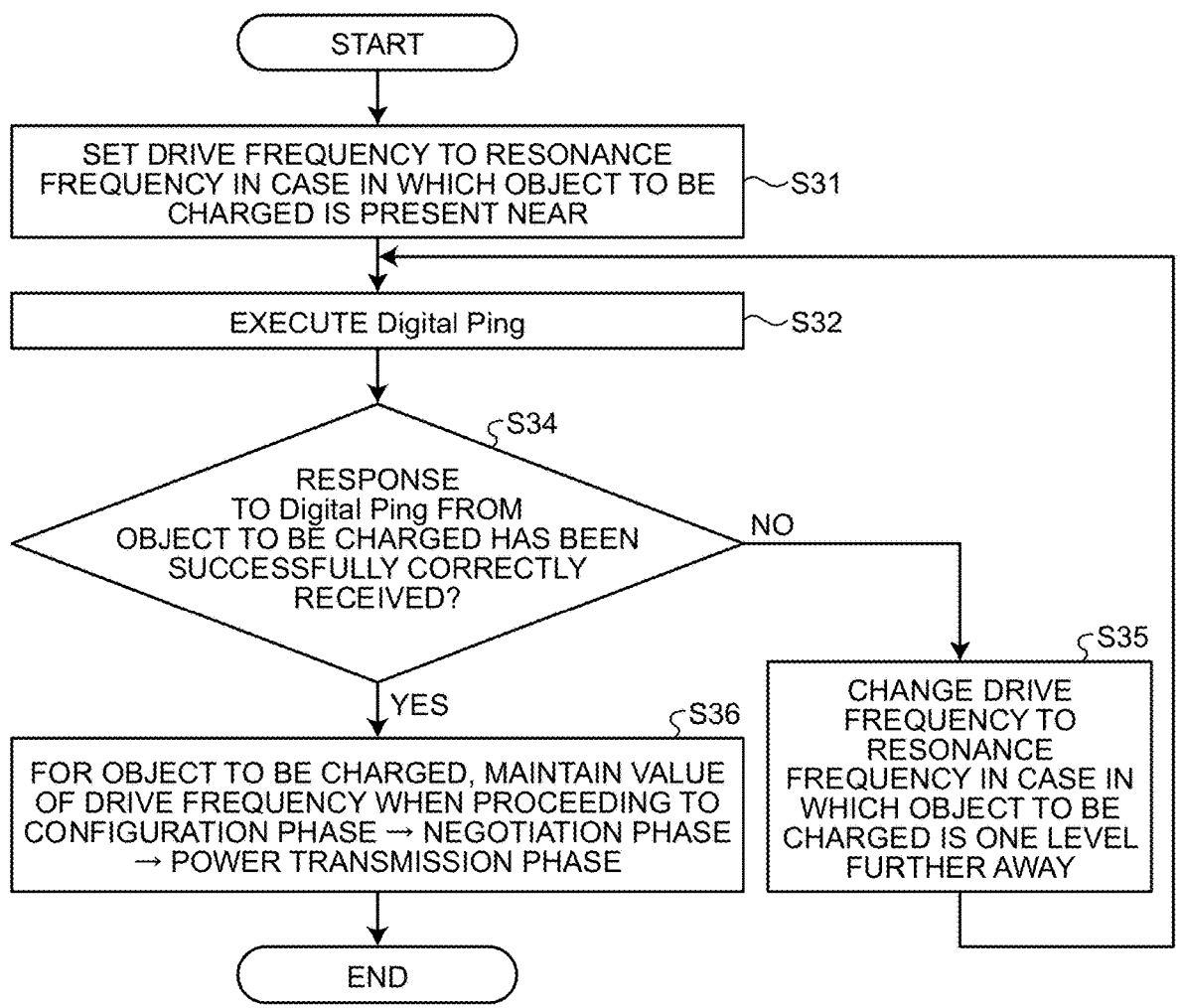
FIG. 10 is a flowchart illustrating an operation of the charging device according to a fourth modification of the embodiment.

As a fourth modification of the embodiment, as illustrated in FIG. 10, in place of calculating the coupling coefficient k and calculating the resonance frequency fr by using the coupling coefficient k, the charging device 1 may search for the resonance frequency fr by viewing a communication response of the object 100 to be charged without calculating the coupling coefficient k. FIG. 10 is a flowchart illustrating an operation of the charging device 1 according to the fourth modification of the embodiment.

In the charging device 1, when the object 100 to be charged is placed on the placement surface 2a and the presence of the object 100 to be charged is detected, the controller 17 controls the drive frequency of the inverter circuit 13 to be the resonance frequency fr that is for the case where the object 100 to be charged is present near the charging device 1 (S31).

Figure 11:
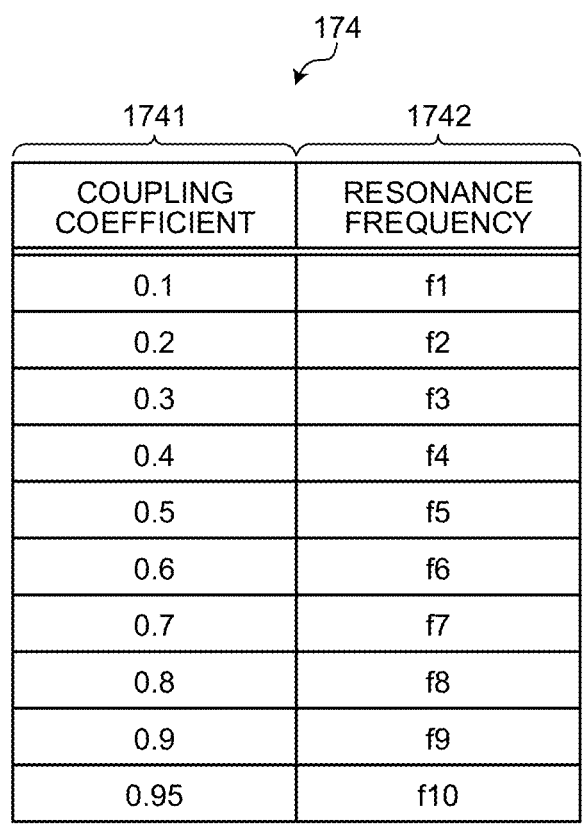
FIG. 11 is a diagram illustrating a data structure of setting information according to the fourth modification of the embodiment.

The controller 17 may have setting information 174 illustrated in FIG. 11. FIG. 11 is a diagram illustrating a data structure of the setting information 174 in the fourth modification of the embodiment.

In the setting information 174, resonance frequencies are each correlated with a different coupling coefficients. The setting information 174 includes a coupling coefficient field 1741 and a resonance frequency field 1742. Values of the coupling coefficients are recorded in the coupling coefficient field 1741. Values of the resonance frequencies are recorded in the resonance frequency field 1742. The values of the resonance frequencies recorded in the resonance frequency field 1742 may be values experimentally determined in advance. By looking up the setting information 174, it is possible to determine the values of the resonance frequencies corresponding to the values of the coupling coefficients. By looking up the setting information 174, it can be determined that the resonance frequency fr=f1 corresponds to the coupling coefficient k=0.1. It can be determined that the resonance frequency fr=f2 corresponds to the coupling coefficient k=0.2. Similarly, it can be determined that the resonance frequency fr=f7 corresponds to the coupling coefficient k=0.7. It can be determined that the resonance frequency fr=f8 corresponds to the coupling coefficient k=0.8. It can be determined that the resonance frequency fr=f9 corresponds to the coupling coefficient k=0.9. It can be determined that the resonance frequency fr=f10 corresponds to the coupling coefficient k=0.95.

The controller 17 may set the coupling coefficient k=0.9 that is for the case where the object 100 to be charged is present near the charging device 1. Then, the controller 17 looks up the setting information 174 and controls the drive frequency of the inverter circuit 13 to be the resonance frequency fr=f9 corresponding to the coupling coefficient k=0.9.

The controller 17 executes digital ping (S32). The controller 17 controls the operation frequency of the inverter circuit 13 to be the resonance frequency fr and drives the power transmission coil 3 at the resonance frequency fr. As a result, the controller 17 generates resonant coupling between the power transmission coil 3 and the power reception coil 103 and causes the power transmission coil 3 to transmit the digital ping to the power reception coil 103 in the electric field resonance scheme.

In response to the transmission of the digital ping, the controller 17 receives signal strength data SIG or end power data EPT from the object 100 to be charged. The controller 17 determines whether the response to the digital ping has been correctly received on the basis of the content of the signal strength data SIG or the end power data EPT (S34).

When the signal strength data SIG or the end power data EPT cannot be restored or, even if the signal strength data SIG or the end power data EPT can be restored, a bit error is included by an error detection code or the like, the controller 17 determines that the response to the digital ping has not been successfully correctly received (No in S34). In response to this determination, the controller 17 changes the drive frequency of the inverter circuit 13 to the resonance frequency fr that is for the case where the object 100 to be charged is located one level further away (S35).

For example, if the current resonance frequency is fr=f9 that corresponds to the coupling coefficient k=0.9, the controller 17 sets the coupling coefficient to one level smaller k=0.8 by referring to the setting information 174. Then, the controller 17 changes the drive frequency of the inverter circuit 13 to fr=f8 that corresponds to the coupling coefficient k=0.8 and executes the digital ping again (S32).

When the signal strength data SIG or the end power data EPT can be restored and a bit error is not included by the error detection code or the like, the controller 17 determines that the response to the digital ping has been successfully correctly received (Yes in S34). In response to this determination, the controller 17 completes the ping phase (SC10 in FIG. 4) with respect to the object 100 to be charged, and sequentially performs the configuration phase (SC20), the negotiation phase (SC30), and the power transfer phase (SC40) (S36). During those phases, the controller 17 maintains the operation frequency of the inverter circuit 13 at the changed value of the resonance frequency fr.

In the power transfer phase (SC40), the controller 17 generates resonant coupling between the power transmission coil 3 and the power reception coil 103 such that the wireless charging is performed in the magnetic field resonance scheme. Specifically, the controller 17 controls the operation frequency of the inverter circuit 13 to be the resonance frequency fr and drives the power transmission coil 3 at the resonance frequency fr. With this control, the controller 17 generates resonant coupling between the power transmission coil 3 and the power reception coil 103 and transmits electric power from the power transmission coil 3 to the power reception coil 103 in the electric field resonance scheme.

As described above, in the charging device 1 of the fourth modification of the embodiment, the controller 17 searches for the resonance frequency fr corresponding to the power reception coil 103 and the capacitor 104 while performing communication with the object 100 to be charged. Then, the controller 17 adjusts the drive frequency of the inverter circuit 13 to the resonance frequency fr searched for, and generates resonant coupling between the power transmission coil 3 and the power reception coil 103. Therefore, it is possible to generate resonant coupling between the power transmission coil 3 and the power reception coil 103 without calculating the coupling coefficient k and possible to transmit electric power from the power transmission coil 3 to the power reception coil 103 in the electric field resonance scheme.

Fifth Modification

There is a case that a power transmission coil is moved to the position of a power reception coil of a terminal device with a built-in battery and the terminal device is wirelessly charged by the power transmission coil. In such wireless charging, improvement in power efficiency thereof is requested. The power transmission coil and the power reception coil are brought close to each other in order to improve power efficiency of the power transmission coil and the power reception coil by, for example, aligning the power transmission coil and the power reception coil so as to match their centers. In such a case, the power transmission coil is brought close to the power reception coil while roughly detecting the position of the power reception coil by using an array of position detection coils and precisely detecting, as the position of the power reception coil, a position at which an oscillation frequency is the highest by using an AC power supply as an oscillation circuit of a self-excited AC power supply.

However, considering the market request for higher power efficiency in recent years, there is a demand for further improvement in power efficiency. In addition, when a cover or a case is attached to the terminal device or when a mechanism for changing relative positions of the power transmission coil and the power reception coil is provided, in some case, the power efficiency is deteriorated because the power transmission coil and the power reception coil cannot be sufficiently brought close to each other because of physical limitation thereof and sufficient power cannot be transmitted.

Therefore, as a fifth modification of the embodiment, another contrivance for improving the power efficiency in the wireless charging will be described. In the following description, a case is exemplified in which an object to be charged, which is a charging target by the charging device, is a terminal device such as a smartphone, a tablet terminal, an audio player, or a mobile phone. However, the object to be charged is not limited to the terminal device and may be any electronic equipment having a communication function and a wireless charging function.

Figure 12:
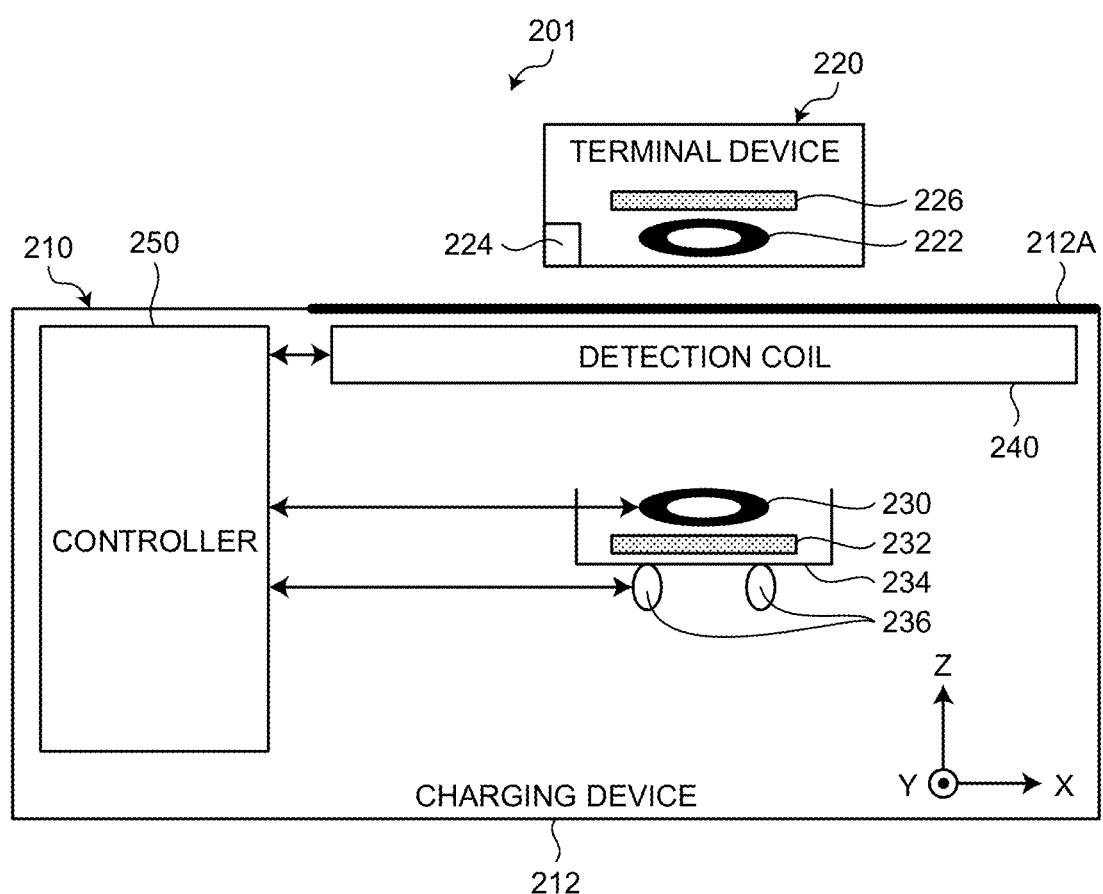
FIG. 12 is a diagram illustrating an example of a schematic configuration of a charging system according to a fifth modification of the embodiment.

FIG. 12 is a diagram illustrating an example of a schematic configuration of a charging system 201 according to the embodiment. As illustrated in FIG. 12, the charging system 201 includes a charging device 210 and a terminal device 220.

The charging device 210 is a device that performs non-contact charging, namely, wireless charging, on the terminal device 220 that is a charging target (an object to be charged) placed on a placement surface 212A of the charging device 210.

The wireless charging means that charging is wirelessly performed. In the following description, a form that the wireless charging means charging by electromagnetic induction action will be described as an example.

In the wireless charging, as an example, in a state where the charging target terminal device 220 is placed on the upper surface (for example, the placement surface 212A) of a placement section of the charging device 210, a power transmission coil 230 of the charging device 210 is moved by a moving mechanism 236 and brought close to a power reception coil 222 of the terminal device 220, whereby positioning of the power transmission coil 230 and the power reception coil 222 is performed.

Note that, in the wireless charging, the charging is more efficiently performed as the power transmission coil 230 of the charging device 210 and the power reception coil 222 of the charging target terminal device 220 are closer to a facing positional relation. Considering an MPP (Magnetic Power Profile), the charging device 210 according to the present disclosure may include a magnet placed together with the power transmission coil 230.

The terminal device 220 serving as the charging target by the charging device 210 is an example of electronic equipment incorporating a battery 224. The terminal device 220 is configured to be capable of operating by using electric power from the incorporated battery 224. The battery 224 is configured to be chargeable by electric power wirelessly transmitted from the charging device 210.

The terminal device 220 further includes at least the power reception coil 222. The power reception coil 222 is configured to be capable of receiving electric power wirelessly transmitted from the charging device 210. The power reception coil 222 is, for example, an induction coil electromagnetically coupled to the power transmission coil 230 of the charging device 210. The electric power induced by the power reception coil 222 is supplied to the battery 224.

A magnetic sheet 226 is provided on the rear surface of the power reception coil 222. Occurrence of malfunctions of various electronic circuits provided in the terminal device 220 is suppressed by the magnetic sheet 226.

A placement surface 212A is provided in a housing 212 of the charging device 210. The placement surface 212A is a surface for placing the terminal device 220 that is a wireless charging target. In the present embodiment, a form in which the placement surface 212A is a partial region of the outer surface of the housing 212 and is a two-dimensional planar region will be described as an example.

In the fifth modification, description is made assuming that the placement surface 212A is a two-dimensional plane extending along a plane defined by a first direction and a second direction orthogonal to the first direction. As illustrated in FIG. 12, description is made assuming that the first direction is an X-axis direction and the second direction is a Y-axis direction. The X-axis direction and the Y-axis direction are directions orthogonal to each other along the two-dimensional plane of the placement surface 212A. Description is made by assuming that a Z-axis direction orthogonal to the X-axis direction and the Y-axis direction corresponds to the thickness direction of the housing 212. The Z-axis direction corresponds to a facing direction of the terminal device 220 and the charging device 210 placed on the placement surface 212A.

The charging device 210 includes at least a power transmission coil 230, a moving mechanism 236, a plurality of detection coils 240, and a controller 250. The power transmission coil 230, the moving mechanism 236, the plurality of detection coils 240, and the controller 250 are provided in the housing 212 of the charging device 210.

The power transmission coil 230 is a coil for transmitting electric power to the terminal device 220. Specifically, the power transmission coil 230 is a charging coil for generating an AC magnetic field for charging and supplying electric power to the power reception coil 222 through electromagnetic induction with the power reception coil 222 of the terminal device 220.

A magnetic sheet 232 is provided on the rear surface of the power transmission coil 230. The magnetic sheet 232 prevents an AC magnetic field generated in the power transmission coil 230 from affecting various electronic circuits provided in a region on the opposite side of the detection coils 240 with respect to the power transmission coil 230 in the charging device 210. Electric power due to the AC magnetic field generated in the power transmission coil 230 is effectively supplied to the power reception coil 222 by the magnetic sheet 232. Thus, the magnetic sheet 232 contributes to prevention of malfunction of various electronic circuits provided in the charging device 210 and improvement of power transmission efficiency from the power transmission coil 230 to the power reception coil 222.

In the fifth modification, the power transmission coil 230 is placed on a conveyance table 234 via the magnetic sheet 232.

The moving mechanism 236 is a mechanism that changes a relative position between the power transmission coil 230 and the power reception coil 222. In the fifth modification, the moving mechanism 236 is a mechanism that moves the power transmission coil 230 along the placement surface 212A. In the fifth modification, the moving mechanism 236 moves the conveyance table 234, on which the magnetic sheet 232 and the power transmission coil 230 are placed in this order, along the placement surface 212A to move the power transmission coil 230 placed on the conveyance table 234 along the placement surface 212A together with the magnetic sheet 232.

The moving mechanism 236 is configured by using at least one drive motor, such a stepping motor or a servo motor, and a support member, etc. The moving mechanism 236 is configured to be capable of moving the conveyance table 234 in each of the X-axis direction and the Y-axis direction along the placement surface 212A by driving of the drive motor. Thus, the power transmission coil 230 is configured to be movable along a two-dimensional plane, which is the XY plane, extending along the placement surface 212A by the moving mechanism 236.

The detection coils 240 are a coil group for detecting the position of the power reception coil 222 of the terminal device 220 on the placement surface 212A. The position of the power reception coil 222 of the terminal device 220 is represented by a position on the two-dimensional plane formed by the XY plane extending along the placement surface 212A. When the power reception coil 222 is an annular induction coil illustrated in FIG. 12, the position of the power reception coil 222 is defined as, for example, the position of the center point of an annular ring on the XY plane extending along the placement surface 212A. The detection coils 240 are disposed under the placement surface 212A and arrayed along the placement surface 212A in the housing 212 of the charging device 210. In one example, the detection coils 240 are placed in a matrix in a direction intersecting one another. The detection coils 240 are an example of a detection unit.

Note that the charging device 210 may be configured to be capable of detecting the position of the power reception coil of the terminal device 220 placed on the placement surface 212A and may include another component for detecting the position of the power reception coil. In such a case, the charging device 210 may be provided with various sensors such as a weight sensor, a pressure-sensitive sensor, and/or an optical sensor capable of detecting the position of the terminal device 220 placed on the placement surface 212A, or provided with a camera that images the placement surface 212A.

Figure 13:
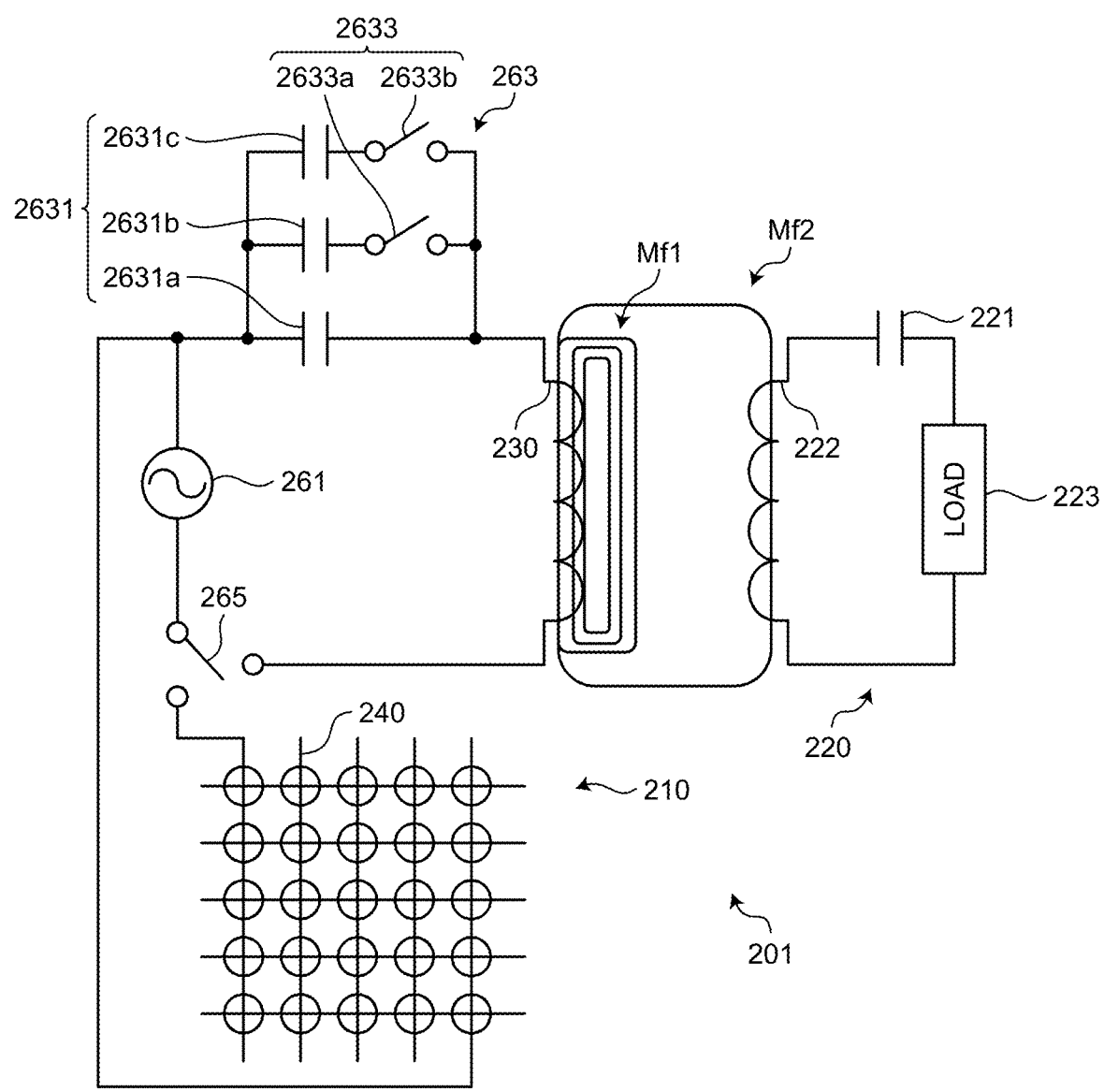
FIG. 13 is a diagram illustrating an example of a configuration relating to power transmission of the charging system according to the fifth modification of the embodiment.

FIG. 13 is a diagram illustrating an example of a configuration relating to power transmission of the charging system 201 illustrated in FIG. 12. The charging device 210 further includes an AC power supply 261, a resonance capacitor 263, and a switch for coil power feed 265.

In the example illustrated in FIG. 13, the power transmission coil 230 of the charging device 210 has one end electrically connected to one end of the AC power supply 261 via the resonance capacitor 263 and the other end electrically connected to the other end of the AC power supply 261 via the switch for coil power feed 265.

In the example illustrated in FIG. 13, the plurality of detection coils 240 of the charging device 210 has one end electrically connected to one end of the AC power supply 261 on the resonance capacitor 263 side and the other end electrically connected to the other end of the AC power supply 261 via the switch for coil power feed 265.

In the example illustrated in FIG. 13, the power reception coil 222 of the terminal device 220 has one end electrically connected to the load 223 via a capacitance 221 and the other end electrically connected to the other end of the load 223. Note that the capacitance 221 can be configured by, for example, the stray capacitance of the power reception coil 222 but a capacitor may be actually provided. The load 223 includes the battery 224.

The AC power supply 261 has one end electrically connected to the resonance capacitor 263 and the other end electrically connected to the switch for coil power feed 265. The AC power supply 261 outputs AC power supplied to the power transmission coil 230 or the plurality of detection coils 240 by using electric power supplied from an external power supply provided outside the charging device 210 such as an in-vehicle battery or a commercial power supply or a battery mounted on the charging device 210.

The resonance capacitor 263 is electrically connected between the AC power supply 261 and the power transmission coil 230. The resonance capacitor 263 is configured to have variable capacitance. The resonance capacitor 263 is configured to be capable of adjusting a resonance frequency (an induction frequency) on the power transmission coil 230 side with a change in the capacitance thereof. In one example, the resonance capacitor 263 may be multiple capacitors to be selectively enabled or a capacitor having variable capacitance.

FIG. 13 exemplifies the resonance capacitor 263 that is configured to have variable capacitance by multiple capacitors 2631 being selectively enabled by multiple switches 2633. In the example illustrated in FIG. 13, the capacitors 2631 include a first capacitor 2631a, a second capacitor 2631b, and a third capacitor 2631c. Each of the switches 2633 is configured to switch on and off in accordance with the control of the controller 250. The switches 2633 include a first switch 2633a and a second switch 2633b. The first capacitor 2631a has one end electrically connected to the AC power supply 261 and the other end electrically connected to the power transmission coil 230. The second capacitor 2631b has one end electrically connected to the AC power supply 261 and the other end electrically connected to the power transmission coil 230 via the first switch 2633a. The third capacitor 2631c has one end electrically connected to the AC power supply 261 and the other end electrically connected to the power transmission coil 230 via the second switch 2633b. Therefore, the resonance capacitor 263 illustrated in FIG. 13 is capable of changing the capacitance thereof in four stages in accordance with on/off states of the first switch 2633a and the second switch 2633b.

Note that the number of the capacitors 2631 and the capacitance of each of the capacitors 2631 may be determined as appropriate, for example, in response to a request for an adjustment width and the number of adjustment stages of a resonance frequency. Similarly, the number of the switches 2633 may be determined as appropriate, for example, in response to a request for an adjustment width and the number of adjustment stages of a resonance frequency and the number of the capacitors 2631 and the capacitance of each of the capacitors 2631.

The switch for coil power feed 265 switches, in accordance with the control of the controller 250, between the power transmission coil 230 and the plurality of detection coils 240 as a connection destination coil to which one end of the AC power supply 261 on the opposite side of the resonance capacitor 263 is electrically connected. Note that the switch for coil power feed 265 can also bring, in accordance with the control of the controller 250, one end of the AC power supply 261 on the opposite side of the resonance capacitor 263 into a state of being electrically connected to none of the power transmission coil 230 and the plurality of detection coils 240.

The switch for coil power feed 265 may include a switch that switches on and off of supply of AC power to the power transmission coil 230 and a switch that switches on and off of supply of AC power to the plurality of detection coils 240. The switch for coil power feed 265 may be provided as part of the AC power supply 261.

When, for example, the switch for coil power feed 265 electrically connects one end of the AC power supply 261 on the opposite side of the resonance capacitor 263 to the power transmission coil 230 in accordance with the control of the controller 250, the power transmission coil 230 is electromagnetically coupled to the power reception coil 222 of the terminal device 220 to thereby supply, to the power reception coil 222, the AC power supplied from the AC power supply 261.

The efficiency of power transmission from the power transmission coil 230 to the power reception coil 222, that is, power efficiency, has a correlation with a coupling coefficient of this electromagnetic coupling. The coupling coefficient is defined as a value of 0 to 1. For example, the coupling coefficient being "0" represents a state where a magnetic flux Mf1 from the power transmission coil 230 is not transmitted to the power reception coil 222 and the power transmission coil 230 and the power reception coil 222 are not coupled. On the other hand, the coupling coefficient being "1" represents a state where the magnetic flux Mf1 from the power transmission coil 230 has no leakage magnetic flux Mf2 and the power transmission coil 230 and the power reception coil 222 are completely coupled. Note that the coupling coefficient being the largest does not necessarily mean that the power efficiency between the coils is the largest.

The AC power supplied to the power reception coil 222 is converted into DC power by a rectifier (not illustrated) of the load 23 provided in the terminal device 220 and charges the battery 224 of the load 223 incorporated in the terminal device 220. As a result, the battery 224 of the terminal device 220 is wirelessly charged.

Figure 14:
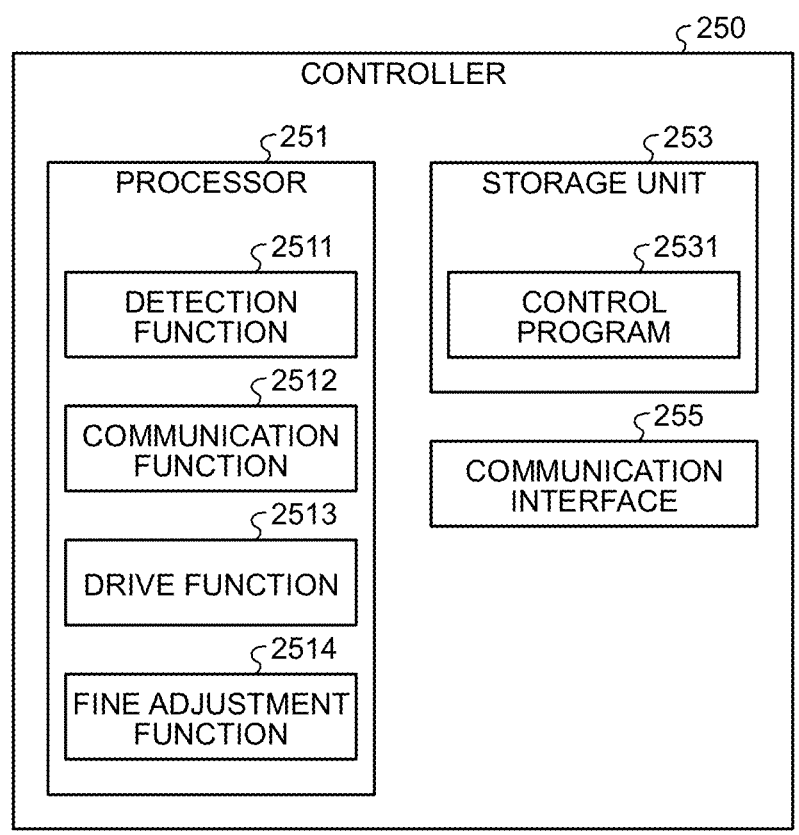
FIG. 14 is a diagram illustrating an example of a configuration of a controller in the fifth modification of the embodiment.

The controller 250 is configured to control the operation of the charging device 210 and execute, for example, charging processing. FIG. 14 is a diagram illustrating an example of a configuration of the controller 250 illustrated in FIG. 12.

The controller 250 includes a processor 251, a storage unit 253, and a communication interface 255. Here, the controller 250 according to the embodiment is an example of a control unit.

The processor 251 controls the overall operation of the controller 250. The processor 251 reads a control program 2531 stored in, for example, a ROM (Read Only Memory)

of the storage unit 253 and executes the control program 2531 loaded in a RAM (Random Access Memory) of the storage unit 253 to thereby implement functions of a detection function 2511, a communication function 2512, a drive function 2513, and a fine adjustment function 2514.

As the processor 251, various hardware processors such as a CPU (Central Processing Unit), a GPU (Graphics Processing Unit), an ASIC (Application Specific Integrated Circuit), and an FPGA (Field Programmable Gate Array) can be used as appropriate.

In the detection function 2511, the processor 251 controls the plurality of detection coils 240 to detect the position of the power reception coil 222. The processor 251 selectively sequentially outputs a signal for generating a magnetic field for detection to each of the detection coils 240. The processor 251 is configured to determine the placement position of the charging target terminal device 220, namely, the position of the power reception coil 222, on the basis of an echo signal returned from the power reception coil 222 in response to the magnetic field for detection and detected by each of the detection coils 240.

In the communication function 2512, the processor 251 controls the power transmission coil 230 to perform communication with the power reception coil 222. The processor 251 is configured to perform communication with the terminal device 220 via the power transmission coil 230 when the power transmission coil 230 is moved to a position facing the power reception coil 222 of the terminal device 220 in accordance with the control of the drive function 2513.

A communication function between the charging device 210 and the terminal device 220 will be described. As described above, the power transmission coil 230 of the charging device 210 and the power reception coil 222 of the terminal device 220 can be electromagnetically coupled. The charging device 210 and the terminal device 220 execute communication by utilizing this electromagnetic coupling. By adjusting loads of the power transmission coil 230 and the power reception coil 222, the charging device 210 and the terminal device 220 transmit data as a fluctuation in a coupling field. Specifically, the charging device 210 transmits data modulated by FSK (Frequency Shift Keying) to the terminal device 220. Upon receiving data modulated by load modulation in the terminal device 220, the charging device 210 demodulates the data. Through these kinds of processing, information can be exchanged between the charging device 210 and the terminal device 220.

In the drive function 2513, the processor 251 controls the moving mechanism 236 to change a relative position between the coils based on the detected position of the power reception coil 222. Note that the adjustment of the relative position between the coils is adjustment in a first stage in the control processing and can be expressed as "rough adjustment" or "sparse adjustment". Here, the "rough adjustment" is an example of the first adjustment. A relative position after the "rough adjustment" is an example of a first relative position. The processor 251 is configured to move and dispose the power transmission coil 230 to a charging start position corresponding to a position where the charging target terminal device 220 is detected and cause the power transmission coil 230 to transmit electric power. The charging start position is a position where the terminal device 220 is placed, namely, a position facing the detection position of the power reception coil 222 and is the relative position after the "rough adjustment". Thus, the processor 251 starts charge control for transmitting electric power to the terminal device 220 at the relative position after the "rough adjustment". Typically, positions in the horizontal direction, namely, positions viewed from the upper surface side of the charging start position and the detection position of the power reception coil 222 correspond or substantially correspond to each other. In other words, at the charging start position, the center positions are aligned or substantially aligned between the power transmission coil 230 and the power reception coil 222.

In the fine adjustment function 2514, the processor 251 is configured to execute at least one of fine adjustment processing (see FIG. 16) based on the control of the resonance capacitor 263 and fine adjustment processing (see FIG. 17) based on a change in a coil relative position in a state where power transmission coil 230 is moved to the charging start position and power transmission by the power transmission coil 230 is started.

In the fine adjustment processing based on the control of the resonance capacitor 263, the processor 251 controls the capacitance of the resonance capacitor 263 based on a parameter (communication information) related to a coupling coefficient prior to "fine adjustment" of a relative position between the coils described later to thereby adjust a resonance frequency of electric power wirelessly transmitted from the power transmission coil 230. Note that the adjustment of the resonance frequency is adjustment in a second stage in the control processing according to the present embodiment and is an example of third adjustment.

In the fine adjustment processing based on the change in the coil relative position, the processor 251 controls the moving mechanism 236 to change the relative position between the coils from the relative position after the adjustment by the "rough adjustment" based on information (communication information) about a power amount of electric power received from the power reception coil 222 by the communication. Note that the adjustment of the relative position between the coils is adjustment in a second stage in the control processing according to the present embodiment and can be expressed as "fine adjustment" or "precise adjustment". Here, the "fine adjustment" of the relative position between the coils is an example of second adjustment. The relative position after the "fine adjustment" of the relative position between the coils is an example of a second relative position. In one example, the second relative position is a position different from the first relative position and is a position at which the center positions are not aligned between the power transmission coil 230 and the power reception coil 222. Typically, the second relative position is a peak position of power efficiency expressed by a ratio of a power amount of electric power received by the power reception coil 222 to electric power wirelessly transmitted from the power transmission coil 230.

As a hardware component, various storage media and storage devices such as a ROM, an HDD (Hard Disk Drive), an SSD (Solid State Drive), and a flash memory can be used as appropriate as the storage unit 253. In the storage unit 253, a RAM that temporarily stores data during work is further provided. The storage unit 253 stores various data and programs used in the controller 250.

The communication interface 255 is configured to be capable of wirelessly communicating with a charging target terminal device. The communication interface 255 includes a communication circuit for wireless communication as a hardware component. As the communication circuit for wireless communication, a communication circuit that is compliant with various standards such as 4G, 5G, 6G, Wi-Fi (registered trademark), Bluetooth (registered trademark), and infrared communication can be used as appropriate.

Figure 15:
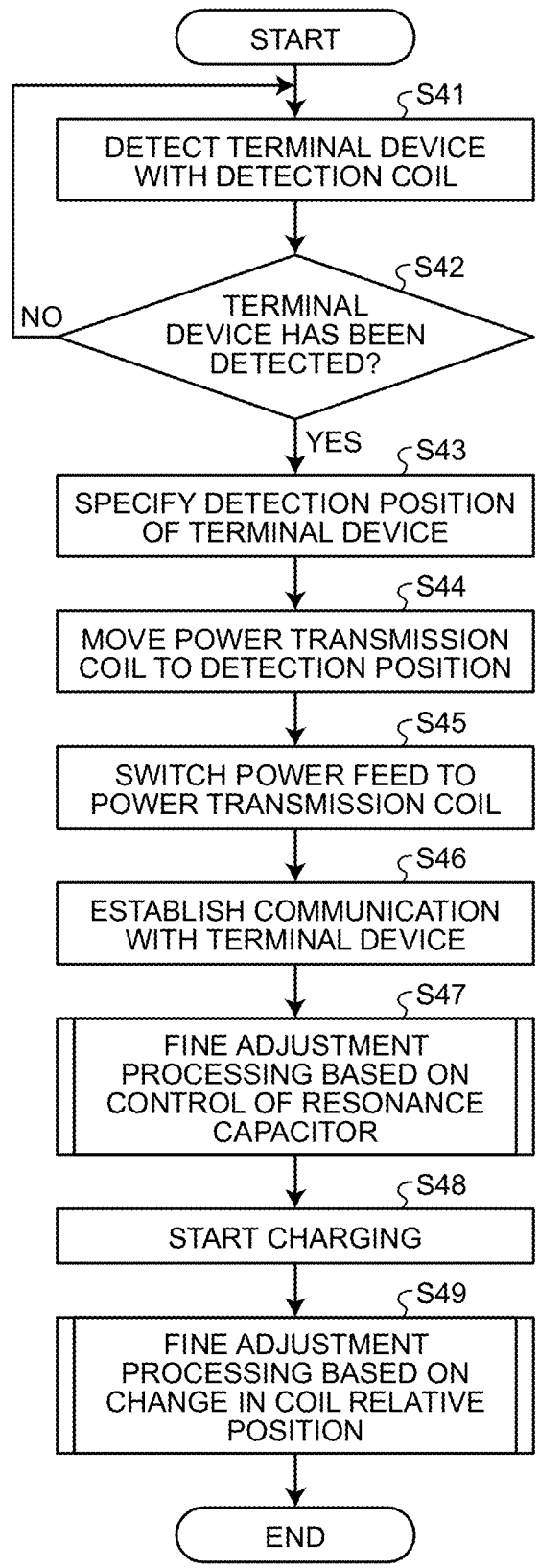
FIG. 15 is a flowchart illustrating an example of a procedure of control processing executed by the charging device in the fifth modification of the embodiment.

Subsequently, a procedure of control processing executed by the charging device 210 configured as described above will be described. FIG. 15 is a flowchart illustrating an example of a procedure of control processing executed by the charging device illustrated in FIG. 12.

The detection function 2511 detects the terminal device 220 placed on the placement surface 212A with the plurality of detection coils 240 (S41). In one example, by controlling the switch for coil power feed 265, the detection function 2511 electrically connects one end of the AC power supply 261 on the opposite side of the resonance capacitor 263 to the plurality of detection coils 240 and starts detection of the terminal device 220. Note that the detection of the terminal device 220 is performed at any time at a cycle that is predetermined and stored in the storage unit 253 or the like.

The detection function 2511 determines whether the terminal device 220 has been detected (S42). When the terminal device 220 has not been detected (S42: No), the processing returns to S41.

On the other hand, when the terminal device 220 has been detected (S42: Yes), the detection function 2511 determines the detection position of the terminal device 220, namely, the position of the power reception coil 222 (S43).

The drive function 2513 controls the moving mechanism 236 to move the power transmission coil 230 to the determined position of the power reception coil 222 (S44). In one example, the drive function 2513 performs "rough adjustment" for adjusting the relative positions of the power transmission coil 230 and the power reception coil 222 such that the center positions of the power transmission coil 230 and the power reception coil 222 are aligned or substantially aligned with each other. Here, the center positions substantially aligned between the coils mean that the center positions are in the vicinity of matching positions.

The drive function 2513 switches power feed to the power transmission coil 230 subjected to the "rough adjustment" (S45). In one example, the drive function 2513 controls the switch for coil power feed 265 at a stage when the "rough adjustment" is completed to thereby electrically connect one end of the AC power supply 261 on the opposite side of the resonance capacitor 263 to the power transmission coil 230 and switch a supply destination of the AC power to the power transmission coil 230.

Thereafter, the communication function 2512 establishes communication with the terminal device 220 (S46). After the communication with the terminal device 220 is established, the fine adjustment function 2514 performs fine adjustment processing based on the control of the resonance capacitor 263 (S47). The fine adjustment processing based on the control of the resonance capacitor 263 is described later (see FIG. 16). The drive function 2513 drives the power transmission coil 230 and starts a charging operation including power transmission from the power transmission coil 230 to the power reception coil 222 (S48). After performing the fine adjustment processing based on the control of the resonance capacitor 263, the fine adjustment function 2514 performs fine adjustment processing based on the change in the coil relative position (S49). The fine adjustment processing based on the change in the coil relative position is described later (see FIG. 17).

Figure 16:
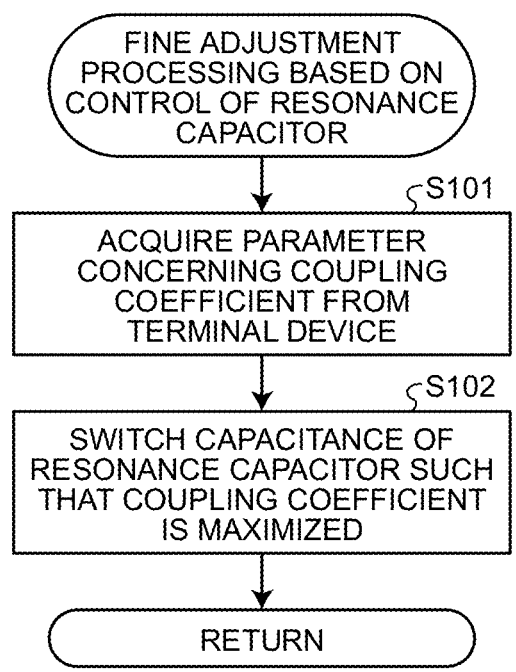
FIG. 16 is a flowchart illustrating an example of a procedure of fine adjustment processing based on control of a resonance capacitor in the fifth modification of the embodiment.

The fine adjustment processing based on the control of the resonance capacitor 263 will be described with reference to the drawings. FIG. 16 is a flowchart illustrating an example of a procedure of the fine adjustment processing based on the control of the resonance capacitor 263 in the control processing illustrated in FIG. 15.

The fine adjustment function 2514 acquires a parameter relative to a coupling coefficient by using the communication established with the terminal device 220 (S101). The parameter relative to the coupling coefficient is information about a coupling coefficient of electromagnetic coupling between the power reception coil 222 and the power transmission coil 230 and is an example of communication information. Note that the parameter relative to the coupling coefficient may be a value itself of the coupling coefficient or various values required for calculating the coupling coefficient. The calculation of the coupling coefficient may be performed in the terminal device 220 or may be performed in the charging device 210.

The fine adjustment function 2514 calculates the coupling coefficient based on, for example, the distance, the angle, and the relative sizes between the coils, and the shapes of the coils.

In the above description, a natural phenomenon called electromagnetic induction is used for the transmission of the electric power used for charging. However, when the resonance frequencies of the charging device 210 and the terminal device 220 match with each other, the phenomenon of the electromagnetic induction shifts to a phenomenon called magnetic field sympathizing in which the charging device 210 and the terminal device 220 mutually sympathize. A phenomenon in which electric power can be transmitted even if the distance between the charging device 210 and the terminal device 220 is long occurs. This phenomenon is generally called magnetic field resonance, magnetic field sympathizing, resonance mode, sympathizing mode, or the like.

Since the coupling coefficient is originally proportional to the magnitude of the mutual inductance between the coils, the coupling coefficient is not affected by a value of a capacitor. However, depending on a calculation method, in the case of the phenomenon called magnetic field resonance, magnetic field sympathizing, resonance mode, sympathizing mode, or the like (hereinafter referred to as resonance mode), the coupling coefficient is affected by a value of a capacitor and a value of a resonance frequency.

Actually, the coupling coefficient cannot be directly measured. Therefore, there is a method of measuring an electromotive force of the terminal device 220 and approximately calculating the coupling coefficient based on specific parameters such as the distance, the angle, and the relative sizes between the coils and the shapes of the coils described above.

Moreover, in the case of the resonance mode, the electromotive force of the terminal device 220 changes depending on the resonance frequency. As a result, the coupling coefficient depends on the resonance frequency and depends on a capacitor value of a resonance circuit.

Accordingly, in the case of the resonance mode, the coupling coefficient is maximized when the resonance frequencies of the charging device 210 and the terminal device 220 substantially match with each other.

It is assumed herein that the shape and size of the power transmission coil 230 are set in advance and stored in the storage unit 253 or the like. In the "rough adjustment" according to the present disclosure, the relative positions of the coils are adjusted such that, for example, the center positions of the coils are aligned or substantially aligned between them. Therefore, the distance and the angle between the coils may be treated as known values.

For the distance between the coils in the thickness direction of the charging device 210 (the Z-axis direction), a specific value may be prepared in advance. This value may be prepared for each of the relative sizes between the coils, the shapes of the coils, and a charging standard, or may be calculated by correcting a predetermined value based on the relative sizes between the coils, the shapes of the coils, and the charging standard.

The fine adjustment function 2514 may approximately calculate a value of the coupling coefficient in accordance with Formula 2 and Formula 3 described above on the basis of, for example, the electromotive force of the terminal device 220.

Specifically, the coupling coefficient k is calculated by approximating a ratio p between an electromotive force $V_{rect}$ of the terminal device 220 and electric power (VCTX_PP+Vin) of the charging device 210 in Formula 3 on the assumption that the ratio p is a linear expression via a specific parameter in Formula 2.

In Formula 2, $E_0$ is a parameter specific to a circuit characteristic that affects an output voltage of the charging device 210. $E_1$ is a parameter equivalent to an input voltage of the charging device 210 and specific to the circuit characteristic. $E_0$ and $E_1$ are respectively calculated by calibration or the like in advance and are used as sources of calculation for calculating the coupling coefficient k by approximation of a linear expression.

$V_{rect}$ is received by communication in the charging device 210 from the terminal device 220, and the coupling coefficient k is calculated by approximation of the linear expression by using a specific parameter $E_0$ equivalent to a gradient of the linear expression and a specific parameter $E_1$ equivalent to an intercept of the linear expression.

Here, the coupling coefficient k calculated by the above-described approximation is merely an approximate calculation on the assumption of electromagnetic induction.

On the other hand, in the case of the resonance mode, when the resonance frequencies of the charging device 210 and the terminal device 220 substantially match with each other, the electromotive force $V_{rect}$ of the terminal device 220 behaves to have a maximum value. Therefore, the coupling coefficient calculated by Formula 2 and Formula 3 also behaves to have a maximum value depending on the resonance frequency.

Therefore, by switching the capacitor of the resonance capacitor 263, the resonance frequency of the charging device 210 can be changed, and the coupling coefficient can be set to a maximum value (a largest value). The method thereof will be described below.

The fine adjustment function 2514 switches the capacitance of the resonance capacitor 263 such that the coupling coefficient is maximized (S102). Specifically, the fine adjustment function 2514 controls on and off of each of the switches 2633 to thereby switch a capacitor to be enabled out of the capacitors 2631.

Note that it is assumed that correspondence between a value of the coupling coefficient or a range thereof and a capacitor to be enabled is set in advance and stored in the storage unit 253 or the like. Thus, the fine adjustment function 2514 determines a capacitor to be enabled that corresponds to the coupling coefficient, by making reference to the correspondence data stored in the storage unit 253.

Note that correspondence between the coupling coefficient and the capacitor may indicate a capacitor to be enabled for each value or each range of the coupling coefficient, or may indicate a state of on and off of each of the switches 2633 for each value or each range of the coupling coefficient. Alternatively, in the resonance capacitor 263, a dedicated circuit (not illustrated) that switches on and off of each of the switches 2633 in accordance with input of a value of the coupling coefficient may be provided. In this case, the fine adjustment function 2514 may output, in place of the control signal for controlling each of the switches 2633, a signal indicating the value of the coupling coefficient in order to switch the capacitor of the resonance capacitor 263 such that the coupling coefficient is maximized.

Figure 17:
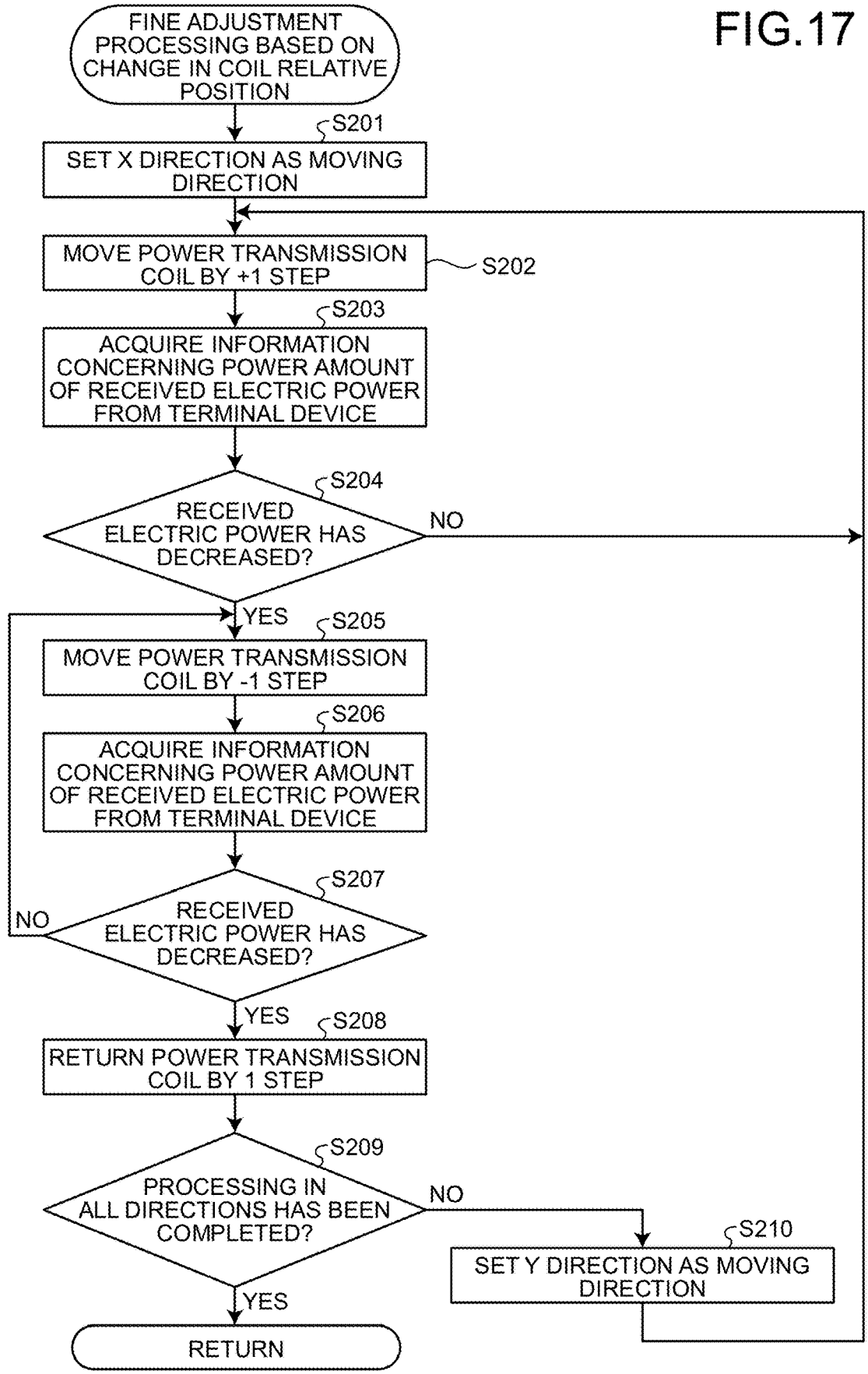
FIG. 17 is a flowchart illustrating an example of a procedure of fine adjustment processing based on a change in a coil relative position in the fifth modification of the embodiment.

Fine adjustment processing based on the change in the coil relative position will be described with reference to the drawings. FIG. 17 is a flowchart illustrating an example of a procedure of fine adjustment processing based on the change in the coil relative position in the control processing illustrated in FIG. 15.

The fine adjustment function 2514 sets the X direction as a moving direction of the power transmission coil 230 (S201).

The fine adjustment function 2514 moves the power transmission coil 230 by "+1" step (S202). The fine adjustment function 2514 acquires information about a power amount of received power from the terminal device 220 (S203). The information about the power amount of the received electric power is, for example, information about a power amount of electric power that is wirelessly transmitted from the power transmission coil 230 and received by the power reception coil 222 of the terminal device 220. The information about the power amount is an example of communication information. The information about the power amount of the received electric power includes, for example, a value of the power amount. Note that the information about the power amount of the received electric power may further include a parameter relative to the coupling coefficient. In this case, the coupling coefficient may be acquired by correcting a coupling coefficient, which has been calculated earlier, on the basis of a change in the distance or the angle between the coils due to a change in the coil relative positions. The fine adjustment function 2514 determines whether the received electric power has decreased (S204). Note that, if transmission electric power changes, the fine adjustment function 2514 may determine in this step (S204) whether power efficiency (power transmission efficiency) obtained by dividing a value of the received electric power by a value of the transmission electric power has decreased. When the received electric power has not decreased (S204: No), the processing returns to S202.

When the received electric power has decreased (S204: Yes), the fine adjustment function 2514 moves the power transmission coil 230 by "−1" step (S205). The fine adjustment function 2514 acquires information about the received power amount from the terminal device 220 in the same manner as in S203 (S206). The fine adjustment function 2514 determines whether the received electric power has decreased in the same manner as in S204 (S207). When the received electric power has not decreased (S207: No), the processing returns to S205. As described above, the fine adjustment function 2514 repeats the same processing as the processing in S202 to S204 in a state where the moving direction of the power transmission coil 230 is reversed.

When the received electric power has decreased even in the state where the moving direction is reversed (S207: Yes), the fine adjustment function 2514 returns the power transmission coil 230 by one step (S208). That is, the fine adjustment function 2514 moves the power transmission coil 230 by "+1" step. In this way, the fine adjustment function 2514 moves, in the moving direction, the power transmission coil 230 to a position at which the received electric power reaches a peak, namely, a position of an efficiency peak of the power efficiency as the resonance frequency changes with the change in the coil relative position.

Thereafter, the fine adjustment function 2514 determines whether the processing in all the directions has been completed (S209). When the processing in all the directions has not been completed (S209: No), the fine adjustment function 2514 sets the Y direction as the moving direction of the power transmission coil 230 (S210). Thereafter, the processing returns to S202. The processing S202 to S208 relative to the Y direction are performed in the same manner as the processing S202 to S208 relative to the X direction. When the processing in all the directions has been completed (S209: Yes), the processing ends.

Note that FIG. 17 exemplifies a case where, after the power transmission coil 230 is moved to a position of an efficiency peak of power efficiency in the X direction, the power transmission coil 230 is moved to a position of an efficiency peak of power efficiency in the Y direction. However, the processing is not limited to this. The procedure illustrated in FIG. 17 may be a procedure in which the processing is performed first in the Y direction. Moving order in moving directions, specifically, the processing order of S202 to S204 and S205 to S207 may be changed.

As described above, the charging device 210 according to the embodiment is configured to perform the "fine adjustment" for changing the relative positions of the coils and adjusting the resonance frequency and move the power transmission coil 230 to the efficiency peak of the power efficiency. With this configuration, it is possible to implement charging in a state where the coil centers are shifted between the power transmission coil 230 and the power reception coil 222, namely, at an efficiency peak. Therefore, with the charging device 210 according to the present embodiment, it is possible to improve the power efficiency in the wireless charging by charging utilizing resonance.

More specifically, the charging device 210 according to the embodiment is configured to start charging at a stage when the "rough adjustment" is completed, namely, prior to the "fine adjustment". In other words, the charging device 210 according to the embodiment is configured to perform control in two stages based on detection results by the detection coils 240. In the first stage, the coupling coefficient is maximized by aligning the coil centers to match the resonance frequency. In the second stage, fine adjustment is performed by aligning the coil relative positions with the efficiency peak of the power efficiency at which the received electric power is maximized. With this configuration, charging can be started in a state where positioning is performed in the "rough adjustment". More specifically, with the configuration described above, the power efficiency can be improved by the "fine adjustment" after the "rough adjustment". Therefore, there is no need to adopt a configuration in which standard charging is not performed and charging is not started unless fixed charging power (for example, 5 W) prescribed by a charging standard is exceeded. Charging can be started at high speed.

The charging device 210 according to the embodiment is configured to adjust the resonance frequency by changing the coil relative positions after adjusting the resonance frequency with the capacitance control of the resonance capacitor 263 in the "fine adjustment" after the "rough adjustment" is completed. With this configuration, after the resonance frequency is roughly adjusted by electrical adjustment by capacitance control of the resonance capacitor 263, the resonance frequency can be adjusted by changing the coil relative position. In other words, in the "fine adjustment", based on the coupling coefficient and electric power transferred from the power transmission coil 230 to the power reception coil 222, the power transmission coil 230 is moved to the position where the power efficiency reaches the efficiency peak. Therefore, with the configuration described above, it is possible to achieve an increase in speed of fine adjustment for moving the power transmission coil 230 to the efficiency peak of the power efficiency and expansion of an adjustment range of the fine adjustment.

With the configuration described above, it is possible to perform, on efficiency deterioration due to positional deviation or a temperature change due to vibration of the coil relative positions between the power transmission coil 230 and the power reception coil 222, the "fine adjustment" adapted to the efficiency peak of the power efficiency at that time. Therefore, it is possible to follow the change. Therefore, with the configuration described above, it is possible to suppress deterioration in the power efficiency due to the positional deviation and the temperature change due to the vibration of the coil relative positions.

Moreover, with the configuration described above, even when a charging frequency (for example, 360 kHz) is prescribed as in the MPP standard, namely, even when a drive frequency of charging by the AC power supply 261 cannot be adjusted, the power efficiency can be improved.

Sixth Modification

In the charging device 210 according to the present disclosure, the "fine adjustment" in the second stage for improving the power efficiency may be performed only in either one of the fine adjustment processing based on the control of the resonance capacitor and the fine adjustment processing based on the change in the coil relative position.

Additionally, depending on a charging standard, the fine adjustment function 2514 may adjust, as the "fine adjustment", the resonance frequency by adjusting the drive frequency of the charging by the AC power supply 261.

Even with these configurations, the same effects as the effects of the fifth modification of the embodiment described above can be obtained.

Seventh Modification

In the charging device 210 of the present disclosure, the change in the relative positions (the coil relative positions) of the power transmission coil 230 and the power reception coil 222 may be implemented by another method of moving the power transmission coil 230.

For example, the charging device 210 may be configured to detachably support the charging target terminal device 220 on the placement surface 212A. In this case, the "rough adjustment" may be carried out by attaching the terminal device 220 to a support unit. The support unit is provided in the charging device 210 such that the power reception coil 222 is located at a position corresponding to the position of the power transmission coil 230. Alternatively, the charging device 210 may be configured to perform the "rough adjustment" by moving the attached terminal device 220 that is configured such that a support unit detachably supporting the terminal device 220 is movable.

The support unit (an example of the support member) supports the terminal device 220 on the placement surface 212A so as to fix the relative position between the power transmission coil 230 and the power reception coil 222 at a predetermined relative position. The predetermined relative position fixed by the support unit is an example of the first relative position. The support unit may be formed by a recess into which the terminal device 220 can be fitted. Alternatively, the support unit may be configured to clamp and hold the terminal device 220. In this case, the support unit may include a movable section for clamping the terminal device 220 may be provided. The movable section may be urged by an elastic member such as a spring or may be configured to be fixable by a screw or the like. Alternatively, the support unit may be configured by a magnet provided together with the power transmission coil 230. The magnet may be able to attract a magnet provided together with the power reception coil 222 of the terminal device 220 and may be implemented by a permanent magnet or may be implemented by an electromagnet. The magnet provided together with the power transmission coil 230 may be configured to be movable independently of the power transmission coil 230. For this reason, a moving mechanism that moves the magnet may be configured integrally with the moving mechanism 236 that moves the power transmission coil 230 or may be independently provided.

A moving mechanism for moving the support unit may share part of the moving mechanism 236 according to the embodiment described above, may be separately provided as an independent moving mechanism, or may be provided in place of the moving mechanism 236. In the charging device 210 in which the terminal device 220 is configured to be movable by the support unit, the power transmission coil 230 may not be configured to be movable. Note that, in these configurations, the "fine adjustment" based on the change in the coil relative position is carried out, for example, by moving the support unit. However, the "fine adjustment" may be carried out by moving the power transmission coil 230 or may be carried out by moving both of the support unit and the power transmission coil 230. The support unit may not be moved in the "rough adjustment".

Even with these configurations, the same effects as the effects of the fifth modification of the embodiment described above can be obtained.

Eighth Modification

Note that the charging device 210 may include multiple power transmission coils 230 for charging two or more terminal devices 220. In this case, the charging device 210 can charge the terminal devices 220 even if those terminal devices 220 and the charging device 210 are separated due to the fine adjustment of adjusting the resonance frequency. Therefore, it is likely that crosstalk of communication occurs between the terminal device 220 newly placed on the placement surface 212A and the terminal device 220 already being charged.

Therefore, when the distance between the terminal devices 220 is less than a threshold that is set in advance and stored in the storage unit 253, the fine adjustment function 2514 may be configured to carry out only the "rough adjustment" in the first stage and not to carry out the "fine adjustment" in the second stage. Note that, in the charging device 210 according to the present disclosure, a terminal position on the placement surface 212A can be accurately grasped based on detection positions by the detection coils 240, the calculated coupling coefficient, and the like.

The determination by the fine adjustment function 2514 is not limited to the determination as to whether to execute the "fine adjustment" based on the distance threshold. The fine adjustment function 2514 may determine a degree of resonance for bringing the resonance close to or away from a resonance point. Specifically, the fine adjustment function 2514 may determine, based on a positional relation between the terminal devices 220, the presence or absence and a degree of resonance by means such as adjustment of a drive frequency of charging by the AC power supply 261, fine adjustment by switching a capacitor to be enabled among the capacitors 2631 of the resonance capacitor 263, or fine adjustment by a change in a coil relative position.

Moreover, when the resonance frequency is adjusted by the "fine adjustment", namely, when another terminal device 220 is placed anew at a distance closer than the threshold while the terminal device 220 is charged by using resonance, the fine adjustment function 2514 may avoid resonance in the charging of the terminal device 220 being charged so as to slow down the charging. The fine adjustment function 2514 may improve the power efficiency by starting charging of the terminal device 220 newly placed without using resonance, and thereafter, adjusting the resonance frequency with the "fine adjustment" after the terminal device 220 being charged earlier is moved or the charging thereof is completed.

With these configurations, even in a configuration capable of charging two or more terminal devices 220, when the distance between the terminals is sufficiently long or when the terminals are sufficiently separated, the terminals can be efficiently charged by resonance and, when the distance among the terminals is short, the terminals can be charged with resonance avoided and occurrence of crosstalk suppressed.

Note that the charging device 210 according to the fifth to eighth modifications described above can be used as, for example, an in-vehicle device but is not limited to this. The charging device 210 can be used as appropriate as various wireless chargers conforming to a standard such as the Qi standard, such as a device used on a desk.

The program executed by the charging device 210 in the fifth to eighth modifications is provided by being recorded in a computer-readable recording medium such as a CD-ROM, an FD, a CD-R, or a DVD as a file of an installable format or an executable format.

In addition, the program executed by the charging device 210 of the fifth modification to the eighth modification may be stored on a computer connected to a network such as the Internet and provided by being downloaded via the network. The program executed by the charging device 210 may be provided or distributed through a network such as the Internet.

The program executed by the charging device 210 in the fifth modification to the eighth modification may be provided by being incorporated in a ROM or the like in advance.

According to at least one of the fifth to eighth modifications described above, it is possible to improve the power efficiency in the wireless charging.

Ninth Modification

Figure 18:
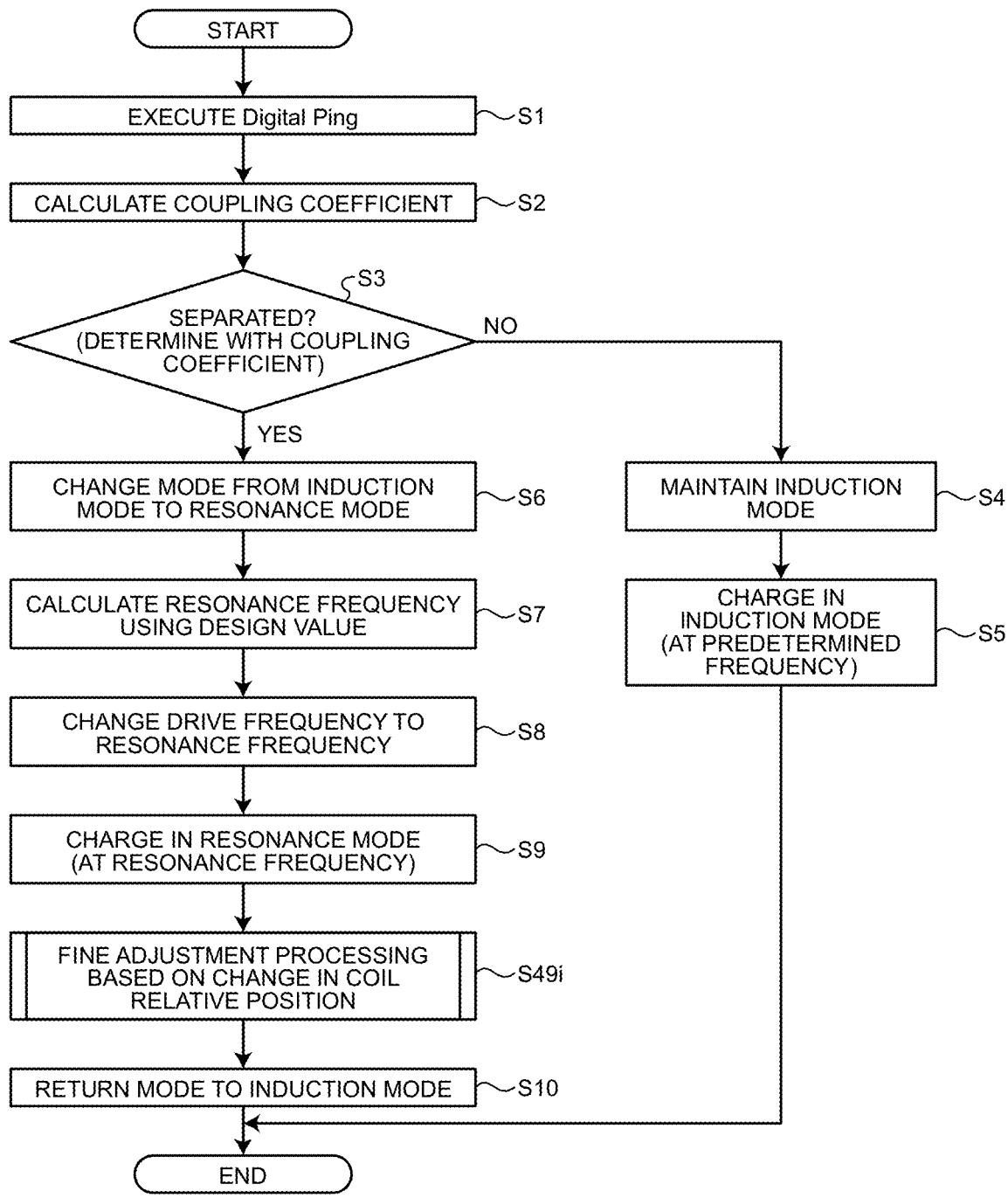
FIG. 18 is a flowchart illustrating an operation of the charging device according to a ninth modification of the embodiment.

As a ninth modification of the embodiment, the charging device 1 (see FIG. 3) may perform an operation illustrated in FIG. 18 in place of that in FIG. 6. FIG. 18 is a flowchart illustrating an operation of the charging device 1 according to the ninth modification of the embodiment.

After S1 to S9 are performed in the same manner as the embodiment, the controller 17 performs fine adjustment processing based on the change of the coil relative position (S49i). The controller 17 performs processing equivalent to S201 to S210 in FIG. 17 as the fine adjustment processing based on the change of the coil relative position.

The controller 17 sets the X direction as a moving direction of the power transmission coil 3 (S201).

The controller 17 moves the power transmission coil 3 by "+1" step (S202). The controller 17 acquires information about a power amount of received electric power from the object 100 to be charged (S203).

The controller 17 determines whether the received electric power has decreased (S204). When the received electric power has not decreased (S204: No), the processing returns to S202.

When the received electric power has decreased (S204: Yes), the controller 17 moves the power transmission coil 3 by "−1" step (S205). As in S203, the controller 17 acquires information about the power amount of the received electric power from the object 100 to be charged (S206). As in S204, the controller 17 determines whether the received electric power has decreased (S207). When the received electric power has not decreased (S207: No), the processing returns to S205. As described above, the controller 17 repeats the same processing as the processing in S202 to S204 in a state where the moving direction of the power transmission coil 3 is reversed.

When the received electric power has decreased even in the state where the moving direction is reversed (S207: Yes), the controller 17 returns the power transmission coil 3 by one step (S208).

The controller 17 determines whether the processing in all the directions has been completed (S209). When the processing in all the directions has not been completed (S209: No), the controller 17 sets the Y direction as the moving direction of the power transmission coil 3 (S210). Thereafter, the processing returns to S202. The processing of S202 to S208 relative to the Y direction is performed in the same manner as the processing of S202 to S208 relative to the X direction. Then, when the processing in all the directions has been completed (S209: Yes), the processing ends.

After S49i, S10 is performed in the same manner as in the above-described embodiment.

As described above, in the charging device 1, the fine adjustment processing based on the change in the coil relative position is performed after S9. Therefore, it is possible to bring the drive frequency closer to the resonance frequency on the object 100 to be charged side and further improve the power transmission efficiency.

Tenth Modification

Figure 19:
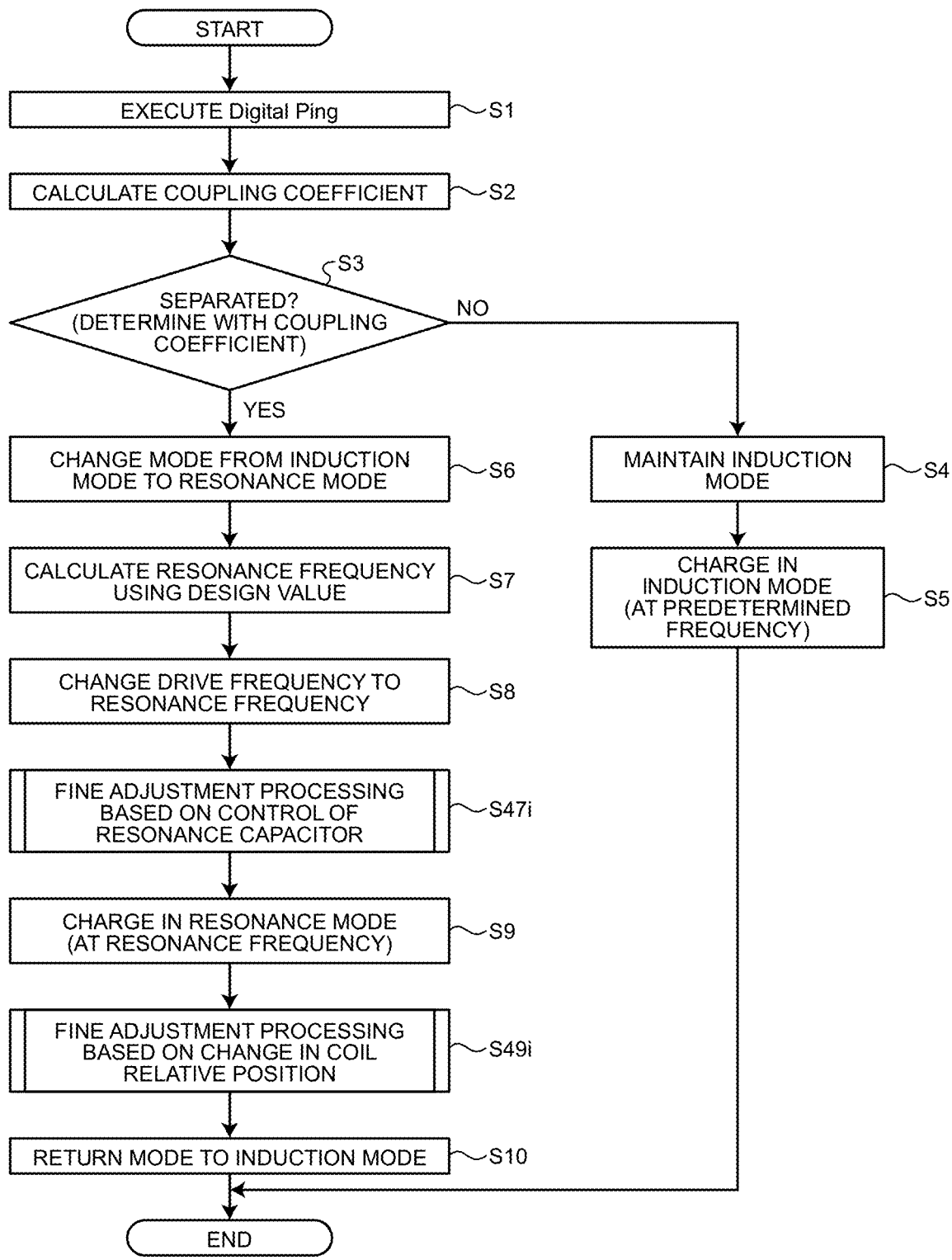
FIG. 19 is a flowchart illustrating an operation of the charging device according to a tenth modification of the embodiment.

As a tenth modification of the embodiment, the charging device 1 (see FIG. 3) may perform an operation illustrated in FIG. 19 in place of FIG. 6. FIG. 19 is a flowchart illustrating the operation of the charging device 1 according to the tenth modification of the embodiment.

The charging device 1 includes a resonance capacitor 263 (see FIG. 13) in place of the capacitor 4 (see FIG. 3).

After the processing of S1 to S8 is performed in the same manner as in the above-described embodiment, the controller 17 performs fine adjustment processing based on the control of the resonance capacitor 263 (S47i). The controller 17 performs processing equivalent to S101 to S102 illustrated in FIG. 16 as the fine adjustment processing based on the control of the resonance capacitor 263.

The controller 17 acquires a parameter relative to a coupling coefficient by using communication established with the object 100 to be charged (S101). The parameter relative to the coupling coefficient is information about a coupling coefficient of electromagnetic coupling between the power reception coil 103 and the power transmission coil 3 and is an example of communication information. Note that the parameter relative to the coupling coefficient may be a value itself of the coupling coefficient or various values required for calculating the coupling coefficient. Thus, the coupling coefficient may be calculated in the object 100 to be charged or may be performed in the charging device 1.

The controller 17 switches the capacitance of the resonance capacitor 263 such that the coupling coefficient is maximized (S102). Specifically, the controller 17 controls on and off of each of the switches 2633 (see FIG. 13) to thereby switch a capacitor to be enabled among the capacitors 2631.

After S47i, the processing of S10 is performed in the same manner as in the above-described embodiment. Then, the controller 17 performs the fine adjustment processing based on the change in the coil relative position (S49i). The controller 17 performs processing equivalent to S201 to S210 in FIG. 17 as the fine adjustment processing based on the change of the coil relative position.

The controller 17 sets the X direction as a moving direction of the power transmission coil 3 (S201).

The controller 17 moves the power transmission coil 3 by "+1" step (S202). The controller 17 acquires information about a power amount of received electric power from the object 100 to be charged (S203).

The controller 17 determines whether the received electric power has decreased (S204). When the received electric power has not decreased (S204: No), the processing returns to S202.

When the received electric power has decreased (S204: Yes), the controller 17 moves the power transmission coil 3 by "−1" step (S205). As in S203, the controller 17 acquires information about the power amount of the received electric power from the object 100 to be charged (S206). As in S204, the controller 17 determines whether the received electric power has decreased (S207). When the received electric power has not decreased (S207: No), the processing returns to S205. As described above, the controller 17 repeats the same processing as the processing in S202 to S204 in a state where the moving direction of the power transmission coil 3 is reversed.

When the received electric power has decreased even in the state where the moving direction is reversed (S207: Yes), the controller 17 returns the power transmission coil 3 by one step (S208).

The controller 17 determines whether the processing in all the directions has been completed (S209). When the processing in all the directions has not been completed (S209: No), the controller 17 sets the Y direction as the moving direction of the power transmission coil 3 (S210). Thereafter, the processing returns to S202. The processing of S202 to S208 relative to the Y direction is performed in the same manner as the processing of S202 to S208 relative to the X direction. Then, when the processing in all the directions has been completed (S209: Yes), the processing ends.

After S49i, S10 is performed in the same manner as in the embodiment.

As described above, in the charging device 1, the fine adjustment processing based on the control of the resonance capacitor 263 is performed after S8 and the fine adjustment processing based on the change in the coil relative position is performed after S9. Therefore, it is possible to bring the drive frequency closer to the resonance frequency on the object 100 to be charged side and further improve the power transmission efficiency.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

NOTES

The present disclosure includes technique described below.

Note 1

A charging device comprising:
a housing including a placement surface on which an object to be charged including a first coil is allowed to be placed;
a second coil housed in the housing at a position corresponding to the first coil; and
a hardware processor connected to memories and configured to
acquire a parameter indicating a distance between the first coil and the second coil,
generate inductive coupling between the first coil and the second coil when the distance indicated by the parameter is less than a distance threshold, and
generate resonant coupling between the first coil and the second coil when the distance indicated by the parameter exceeds the distance threshold.

Note 2

The charging device according to the Note 1, wherein
the parameter includes a coupling coefficient indicating a degree of inductive coupling between the first coil and the second coil, and
the hardware processor is configured to
generate inductive coupling between the first coil and the second coil when the coupling coefficient exceeds a coefficient threshold corresponding to the distance threshold, and
generate resonant coupling between the first coil and the second coil when the coupling coefficient is less than the coefficient threshold.

Note 3

The charging device according to the Note 1, further comprising a drive circuit to which the second coil is connected, the drive circuit being capable of driving the second coil, wherein
the object to be charged further includes a first capacitor to which the first coil is connected, and
the hardware processor is configured to, when the distance indicated by the parameter exceeds the distance threshold, adjust a drive frequency of the drive circuit to a resonance frequency corresponding to the first coil and the first capacitor to implement the generation of resonant coupling between the first coil and the second coil.

Note 4

The charging device according to the Note 2, further comprising:
a drive circuit to which the second coil is connected, the drive circuit being capable of driving the second coil;
a first voltage detection circuit connected to an input side of the drive circuit, the first voltage detection circuit being configured to detect a first voltage on the input side of the drive circuit; and
a second voltage detection circuit connected to an output side of the drive circuit, the second voltage detection circuit being configured to detect a second voltage on the output side of the drive circuit,
wherein the hardware processor is configured to calculate the coupling coefficient based on the first voltage and the second voltage.

Note 5

The charging device according to the Note 3, wherein the hardware processor is configured to, when the distance indicated by the parameter exceeds the distance threshold,
acquire information about a value of the first coil and a value of the first capacitor by communicating with the object to be charged via the drive circuit and the second coil, and
calculate a resonance frequency corresponding to the value of the first coil and the value of the first capacitor each being indicated by the information.

Note 6

The charging device according to the Note 1, further comprising:
a plurality of detection coils housed in the housing and arrayed along the placement surface; and
a moving mechanism configured to change a relative position between the first coil and the second coil,
wherein the hardware processor is configured to
control the plurality of detection coils to detect a position of the first coil,
control the second coil to perform communication with the first coil,
control the moving mechanism to perform a first adjustment of changing the relative position to a first relative position based on the detected position of the first coil, the first relative position being a position at which a center position of the first coil and a center position of the second coil are aligned with each other, and
control the moving mechanism to perform a second adjustment of changing the first relative position to a second relative position based on communication information received from the first coil through the communication, the second relative position being a position different from the first relative position and being a position at which the center position of the first coil and the center position of the second coil are not aligned with each other.

Note 7

The charging device according to the Note 1, further comprising
a support member configured to fix a relative position between the first coil and the second coil as a first relative position by supporting the object to be charged on the placement surface, the first relative position being a position at which a center position of the first coil and a center position of the second coil are aligned with each other, and a moving mechanism configured to change a relative position between the first coil and the second coil, wherein the hardware processor is configured to control the second coil to perform communication with the first coil, and control the moving mechanism to perform a second adjustment of changing the first relative position to a second relative position based on communication information received from the first coil by the communication, the second relative position being a position different from the first relative position and being a position at which the center position of the first coil and the center position of the second coil are not aligned with each other.

Note 8

The charging device according to the Note 6 or 7, wherein the communication information is information about a power amount of electric power received by the first coil after wirelessly transmitted from the second coil.

Note 9

The charging device according to the Note 8, wherein the second relative position is a peak position of power efficiency, the power efficiency being defined by a ratio of the power amount of the electric power received by the first coil to the electric power wirelessly transmitted from the second coil.

Note 10

The charging device according to the Note 8, wherein the communication information includes information about a coupling coefficient of electromagnetic coupling between the first coil and the second coil.

Note 11

The charging device according to the Note 10, further comprising a resonance capacitor electrically connected to the second coil and configured to have variable capacitance, wherein the hardware processor is configured to, prior to the second adjustment, adjust a resonance frequency of the electric power wirelessly transmitted from the second coil by performing a third adjustment of controlling capacitance of the resonance capacitor based on the information about the coupling coefficient.

Note 12

The charging device according to the Note 6 or 7, wherein the hardware processor is configured to start charge control at the first relative position.

Note 13

A charging device comprising:
a housing including a placement surface on which an object to be charged including a first coil and a first capacitor to which the first coil is connected are allowed to be placed;

a second coil housed in the housing at a position corresponding to the first coil;

a drive circuit to which the second coil is connected; and a hardware processor connected to memories and configured to search for a resonance frequency corresponding to the first coil and the first capacitor while performing communication with the object to be charged via the drive circuit and the second coil, and generate resonant coupling between he first coil and the second coil by adjusting a drive frequency of the drive circuit to the resonance frequency.

Note 14

A charging method comprising:
acquiring a parameter indicating a distance between a first coil and a second coil, the first coil being included in an object to be charged placed on a placement surface of a housing, the second coil being housed in the housing at a position corresponding to the first coil; and generating resonant coupling between the first coil and the second coil when the distance indicated by the parameter exceeds a distance threshold.

Note 15

The charging method according to the Note 14, wherein the parameter includes a coupling coefficient between the first coil and the second coil, and the generating of resonant coupling includes generating resonant coupling between the first coil and the second coil when the coupling coefficient is less than a coefficient threshold corresponding to the distance threshold.

Note 16

The charging method according to the Note 14, further comprising:

controlling a plurality of detection coils to detect a position of the first coil, the plurality of detection coils being housed in the housing and arrayed along the placement surface;

controlling the second coil to perform communication with the first coil;

controlling a moving mechanism serving to change a relative position between the first coil and the second coil to perform a first adjustment of changing the relative position to a first relative position based on the detected position of the first coil, the first relative position being a position at which a center position of the first coil and a center position of the second coil are aligned with each other; and controlling the moving mechanism to perform a second adjustment of changing the first relative position to a second relative position based on communication information received from the first coil by the communication, the second relative position being a position different from the first relative position and being a position at which the center position of the first coil and the center position of the second coil are not aligned with each other.

Note 17

The charging method according to the Note 14, further comprising:

controlling the second coil to perform communication with the first coil in a state where a relative position between the first coil and the second coil is fixed to a first relative position at which a center position of the first coil and a center position of the second coil are aligned with each other by supporting the object to be charged on the placement surface with a support member; and controlling a moving mechanism serving to change a relative position between the first coil and the second coil to perform a second adjustment of changing the first relative position to a second relative position based on communication information received from the first coil by the communication, the second relative position being a position different from the first relative position and being a position at which the center position of the first coil and the center position of the second coil not aligned with each other.

Note 18

A charging method comprising:
searching for a resonance frequency corresponding to a first coil and a first capacitor connected to the first coil, the first coil and the first capacitor being included in an object to be charged, the object to be charged being placed on a placement surface of a housing, the searching for the resonance frequency being performed while driving, by a drive circuit, a second coil housed in the housing at a position corresponding to the first coil to perform communication with the object to be charged; and generating resonant coupling between he first coil and the second coil by adjusting a drive frequency of the drive circuit to the resonance frequency.

REFERENCE NOTES

Reference Note 1

A charging device serving to wirelessly charge a terminal device, the terminal device including a power reception that is coil placed on a placement surface and receives wirelessly transmitted electric power, the charging device including:
a power transmission coil configured to transmit electric power to the terminal device;
a plurality of detection coils for detecting a position of the power reception coil of the terminal device placed on the placement surface;
a moving mechanism configured to change a relative position between the power transmission coil and the power reception coil; and
a controller configured to
control the plurality of detection coils to detect the position of the power reception coil,
control the power transmission coil to perform communication with the power reception coil,
control the moving mechanism to perform a first adjustment for changing the relative position to a first relative position based on the detected position of the power reception coil, and
control the moving mechanism to perform a second adjustment for changing the first relative position to a second relative position based on communication information received from the power reception coil by the communication, wherein the first relative position is a position at which a center position of the power reception coil and a center position of the power transmission coil are aligned with each other, and the second relative position is a position different from the first relative position and is a position at which the center position of the power reception coil and the center position of the power transmission coil are not aligned with each other.

Reference Note 2

A charging device serving to wirelessly charge a terminal device, the terminal device including a power reception coil that is placed on a placement surface and receives wirelessly transmitted electric power, the charging device including:
a power transmission coil configured to transmit electric power to the terminal device;
a support unit configured to fix, as a first relative position, a relative position between the power transmission coil and the power reception coil by supporting the terminal device placed on the placement surface;
a moving mechanism configured to change the relative position between the power transmission coil and the power reception coil; and
a controller configured to
control the power transmission coil to perform communication with the power reception coil,
control the moving mechanism to perform a second adjustment for changing the first relative position to a second relative position based on communication information received from the power reception coil by the communication, wherein the first relative position is a position at which a center position of the power reception coil and a center position of the power transmission coil are aligned with each other, and the second relative position is a position different from the first relative position and is a position at which the center position of the power reception coil and the center position of the power transmission coil are not aligned with each other.

Reference Note 3

The charging device according to the Reference Note 1 or the Reference Note 2, in which
the communication information is information about electric power wirelessly transmitted from the power transmission coil and a power amount of electric power received by the power reception coil.

Reference Note 4

The charging device according to the Reference Note 3, wherein the second relative position is a peak position of power efficiency that is defined by a ratio of the power amount of the electric power received by the power reception coil to the electric power wirelessly transmitted from the power transmission coil.

Reference Note 5

The charging device according to the Reference Note 3, wherein the communication information further includes information about a coupling coefficient of electromagnetic coupling between the power reception coil and the power transmission coil.

Reference Note 6

The charging device according to the Reference Note 5, further including a resonance capacitor electrically connected to the power transmission coil and configured to have variable capacitance, wherein
  the controller is configured to, prior to the second adjustment, control capacitance of the resonance capacitor based on the information about the coupling coefficient to perform a third adjustment of adjusting a resonance frequency of electric power wirelessly transmitted from the power transmission coil.

Reference Note 7

The charging device according to the Reference Note 1 or the Reference Note 2, wherein the controller is configured to start charge control at the first relative position.

Reference Note 8

A method of controlling a charging device, the charging device including a power transmission coil serving to wirelessly charge a terminal device including a power reception coil, which is placed on a placement surface and receives wirelessly transmitted electric power, and transmit the electric power to the terminal device, a plurality of detection coils for detecting a position of the power reception coil of the terminal device on the placement surface, and a moving mechanism serving to change a relative position between the power transmission coil and the power reception coil, the method including:
  controlling the plurality of detection coils to detect a position of the power reception coil;
  controlling the power transmission coil to perform communication with the power reception coil;
  performing a first adjustment of controlling the moving mechanism to change the relative position to a first relative position based on the detected position of the power reception coil; and
  performing a second adjustment of controlling the moving mechanism to change the first relative position to a second relative position based on communication information received from the power reception coil by the communication, wherein
  the first relative position is a position at which a center position of the power reception coil and a center position of the power transmission coil are aligned with each other, and
  the second relative position is a position different from the first relative position and is a position at which the center position of the power reception coil and the center position of the power transmission coil are not aligned with each other.

Reference Note 9

A method of controlling a charging device, the charging device including a power transmission coil serving to wirelessly charge a terminal device including a power reception coil, which is placed on a placement surface and receives wirelessly transmitted electric power, and transmits the electric power to the terminal device, a support unit serving to fix, as a first relative position, a relative position between the power transmission coil and the power reception coil by supporting the terminal device placed on the placement surface, and a moving mechanism serving to change the relative position between the power transmission coil and the power reception coil, the method including:
  controlling the power transmission coil to perform communication with the power reception coil; and
  controlling the moving mechanism to perform a second adjustment of changing the first relative position to a second relative position based on communication information received from the power reception coil by the communication, wherein
  the first relative position is a position at which a center position of the power reception coil and a center position of the power transmission coil are aligned with each other, and
  the second relative position is a position different from the first relative position and is a position at which the center position of the power reception coil and the center position of the power transmission coil are not aligned with each other.

Reference Note 10

The method of controlling the charging device according to the Reference Note 8 or the Reference Note 9, wherein the communication information is information about a power amount of electric power received by the power reception coil after wirelessly transmitted from the power transmission coil.

Reference Note 11

The method of controlling the charging device according to the Reference Note 10, wherein the second relative position is a peak position of power efficiency defined by a ratio of the power amount of the electric power received by the power reception coil to the electric power wirelessly transmitted from the power transmission coil.

Reference Note 12

The method of controlling the charging device according to the Reference Note 10, wherein the communication information further includes information about a coupling coefficient of electromagnetic coupling between the power reception coil and the power transmission coil.

Reference Note 13

The method of controlling the charging device according to the Reference Note 12, wherein
  the charging device further includes a resonance capacitor electrically connected to the power transmission coil and configured to have variable capacitance, and
  the method further includes, prior to the second adjustment, performing a third adjustment of adjusting a resonance frequency of electric power wirelessly transmitted from the power transmission coil by controlling capacitance of the resonance capacitor based on the information about the coupling coefficient.

Reference Note 14

The method of controlling the charging device according to the Reference Note 8 or the Reference Note 9, further including starting charge control at the first relative position.

What is claimed is:

1. A charging device comprising:
a housing including a placement surface on which an object to be charged including a first coil is allowed to be placed;
a second coil housed in the housing at a position corresponding to the first coil; and
a hardware processor connected to memories and configured to
acquire a parameter indicating a distance between the first coil and the second coil,
generate inductive coupling between the first coil and the second coil when the distance indicated by the parameter is less than a distance threshold, and
generate resonant coupling between the first coil and the second coil when the distance indicated by the parameter exceeds the distance threshold.

2. The charging device according to claim 1, wherein
the parameter includes a coupling coefficient indicating a degree of inductive coupling between the first coil and the second coil, and
the hardware processor is configured to
generate inductive coupling between the first coil and the second coil when the coupling coefficient exceeds a coefficient threshold corresponding to the distance threshold, and
generate resonant coupling between the first coil and the second coil when the coupling coefficient is less than the coefficient threshold.

3. The charging device according to claim 1, further comprising a drive circuit to which the second coil is connected, the drive circuit being capable of driving the second coil, wherein
the object to be charged further includes a first capacitor to which the first coil is connected, and
the hardware processor is configured to, when the distance indicated by the parameter exceeds the distance threshold, adjust a drive frequency of the drive circuit to a resonance frequency corresponding to the first coil and the first capacitor to implement the generation of resonant coupling between the first coil and the second coil.

4. The charging device according to claim 2, further comprising:
a drive circuit to which the second coil is connected, the drive circuit being capable of driving the second coil;
a first voltage detection circuit connected to an input side of the drive circuit, the first voltage detection circuit being configured to detect a first voltage on the input side of the drive circuit; and
a second voltage detection circuit connected to an output side of the drive circuit, the second voltage detection circuit being configured to detect a second voltage on the output side of the drive circuit,
wherein the hardware processor is configured to calculate the coupling coefficient based on the first voltage and the second voltage.

5. The charging device according to claim 3, wherein the hardware processor is configured to, when the distance indicated by the parameter exceeds the distance threshold,
acquire information about a value of the first coil and a value of the first capacitor by communicating with the object to be charged via the drive circuit and the second coil, and
calculate a resonance frequency corresponding to the value of the first coil and the value of the first capacitor each being indicated by the information.

6. The charging device according to claim 1, further comprising:
a plurality of detection coils housed in the housing and arrayed along the placement surface; and
a moving mechanism configured to change a relative position between the first coil and the second coil,
wherein the hardware processor is configured to
control the plurality of detection coils to detect a position of the first coil,
control the second coil to perform communication with the first coil,
control the moving mechanism to perform a first adjustment of changing the relative position to a first relative position based on the detected position of the first coil, the first relative position being a position at which a center position of the first coil and a center position of the second coil are aligned with each other, and
control the moving mechanism to perform a second adjustment of changing the first relative position to a second relative position based on communication information received from the first coil through the communication, the second relative position being a position different from the first relative position and being a position at which the center position of the first coil and the center position of the second coil are not aligned with each other.

7. The charging device according to claim 1, further comprising
a support member configured to fix a relative position between the first coil and the second coil as a first relative position by supporting the object to be charged on the placement surface, the first relative position being a position at which a center position of the first coil and a center position of the second coil are aligned with each other, and
a moving mechanism configured to change a relative position between the first coil and the second coil, wherein
the hardware processor is configured to
control the second coil to perform communication with the first coil, and
control the moving mechanism to perform a second adjustment of changing the first relative position to a second relative position based on communication information received from the first coil by the communication, the second relative position being a position different from the first relative position and being a position at which the center position of the first coil and the center position of the second coil are not aligned with each other.

8. The charging device according to claim 6, wherein the communication information is information about a power amount of electric power received by the first coil after wirelessly transmitted from the second coil.

9. The charging device according to claim 8, wherein the second relative position is a peak position of power efficiency, the power efficiency being defined by a ratio of the power amount of the electric power received by the first coil to the electric power wirelessly transmitted from the second coil.

10. The charging device according to claim 8, wherein the communication information includes information about a coupling coefficient of electromagnetic coupling between the first coil and the second coil.

11. The charging device according to claim 10, further comprising a resonance capacitor electrically connected to the second coil and configured to have variable capacitance,
wherein the hardware processor is configured to, prior to the second adjustment, adjust a resonance frequency of the electric power wirelessly transmitted from the second coil by performing a third adjustment of controlling capacitance of the resonance capacitor based on the information about the coupling coefficient.

12. The charging device according to claim 6, wherein the hardware processor is configured to start charge control at the first relative position.

13. A charging device comprising:
a housing including a placement surface on which an object to be charged including a first coil and a first capacitor to which the first coil is connected are allowed to be placed;
a second coil housed in the housing at a position corresponding to the first coil;
a drive circuit to which the second coil is connected; and
a hardware processor connected to memories and configured to
search for a resonance frequency corresponding to the first coil and the first capacitor while performing communication with the object to be charged via the drive circuit and the second coil, and
generate resonant coupling between he first coil and the second coil by adjusting a drive frequency of the drive circuit to the resonance frequency.

14. A charging method comprising:
acquiring a parameter indicating a distance between a first coil and a second coil, the first coil being included in an object to be charged placed on a placement surface of a housing, the second coil being housed in the housing at a position corresponding to the first coil; and
generating resonant coupling between the first coil and the second coil when the distance indicated by the parameter exceeds a distance threshold.

15. The charging method according to claim 14, wherein the parameter includes a coupling coefficient between the first coil and the second coil, and
the generating of resonant coupling includes generating resonant coupling between the first coil and the second coil when the coupling coefficient is less than a coefficient threshold corresponding to the distance threshold.

16. The charging method according to claim 14, further comprising:
controlling a plurality of detection coils to detect a position of the first coil, the plurality of detection coils being housed in the housing and arrayed along the placement surface;
controlling the second coil to perform communication with the first coil;
controlling a moving mechanism serving to change a relative position between the first coil and the second coil to perform a first adjustment of changing the relative position to a first relative position based on the detected position of the first coil, the first relative position being a position at which a center position of the first coil and a center position of the second coil are aligned with each other; and
controlling the moving mechanism to perform a second adjustment of changing the first relative position to a second relative position based on communication information received from the first coil by the communication, the second relative position being a position different from the first relative position and being a position at which the center position of the first coil and the center position of the second coil are not aligned with each other.

17. The charging method according to claim 14, further comprising:
controlling the second coil to perform communication with the first coil in a state where a relative position between the first coil and the second coil is fixed to a first relative position at which a center position of the first coil and a center position of the second coil are aligned with each other by supporting the object to be charged on the placement surface with a support member; and
controlling a moving mechanism serving to change a relative position between the first coil and the second coil to perform a second adjustment of changing the first relative position to a second relative position based on communication information received from the first coil by the communication, the second relative position being a position different from the first relative position and being a position at which the center position of the first coil and the center position of the second coil not aligned with each other.

18. A charging method comprising:
searching for a resonance frequency corresponding to a first coil and a first capacitor connected to the first coil, the first coil and the first capacitor being included in an object to be charged, the object to be charged being placed on a placement surface of a housing, the searching for the resonance frequency being performed while driving, by a drive circuit, a second coil housed in the housing at a position corresponding to the first coil to perform communication with the object to be charged; and
generating resonant coupling between he first coil and the second coil by adjusting a drive frequency of the drive circuit to the resonance frequency.

* * * * *